US012687664B2

(12) United States Patent
Solomon et al.

(10) Patent No.: US 12,687,664 B2
(45) Date of Patent: Jul. 21, 2026

(54) ARTICLE AND METHOD OF MANUFACTURE THEREOF

(71) Applicant: 3M INNOVATIVE PROPERTIES COMPANY, St. Paul, MN (US)

(72) Inventors: Jeffrey L. Solomon, Centerville, MN (US); Gary E. Gaides, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 317 days.

(21) Appl. No.: 18/271,889

(22) PCT Filed: Dec. 16, 2021

(86) PCT No.: PCT/IB2021/061885
§ 371 (c)(1),
(2) Date: Jul. 12, 2023

(87) PCT Pub. No.: WO2022/157580
PCT Pub. Date: Jul. 28, 2022

(65) Prior Publication Data
US 2024/0142674 A1 May 2, 2024

Related U.S. Application Data

(60) Provisional application No. 63/138,938, filed on Jan. 19, 2021.

(51) Int. Cl.
*G02B 5/00* (2006.01)
(52) U.S. Cl.
CPC ........ *G02B 5/003* (2013.01); *G02B 2207/123* (2013.01)

(58) Field of Classification Search
CPC .... G02B 6/0003; G02B 1/111; G02B 5/1847; G02B 6/0038; G02B 6/0063
(Continued)

(56) References Cited

U.S. PATENT DOCUMENTS

| | | | |
|---|---|---|---|
| 6,398,370 B1 | 6/2002 | Chiu et al. | |
| 7,236,286 B2 * | 6/2007 | Clikeman | G02B 6/0053 |
| | | | 359/247 |

(Continued)

FOREIGN PATENT DOCUMENTS

WO 2020026139 A1 2/2020

OTHER PUBLICATIONS

International Search Report for PCT International Application No. PCT/IB2021/061885, mailed on Mar. 1, 2022, 3 pages.

*Primary Examiner* — Daniel St Cyr
(74) *Attorney, Agent, or Firm* — Jonathan L. Tolstedt

(57) ABSTRACT

An article includes a first microstructured layer and a second microstructured layer. The first microstructured layer includes a plurality of first microstructures forming a plurality of first grooves therebetween. The second microstructured layer includes a plurality of second microstructures disposed adjacent to the plurality of first microstructures. The plurality of second microstructures forms a plurality of second grooves therebetween. The article further includes a light absorbing material disposed in at least each of the plurality of first grooves and each of the plurality of second grooves. The light absorbing material bonds the first microstructured layer to the second microstructured layer.

19 Claims, 12 Drawing Sheets

(58) Field of Classification Search
USPC ........................................................ 359/614
See application file for complete search history.

(56)                       References Cited

U.S. PATENT DOCUMENTS

| | | | |
|---|---|---|---|
| 7,419,272 | B2 * | 9/2008 | Schenke ........... G02F 1/133555 |
| | | | 359/601 |
| 9,329,311 | B2 * | 5/2016 | Halverson ......... G02F 1/133524 |
| 9,335,449 | B2 * | 5/2016 | Gaides ................. G02B 5/0263 |
| 2005/0128579 | A1 | 6/2005 | Thomas et al. |
| 2017/0108628 | A1 | 4/2017 | Larsen et al. |
| 2019/0346600 | A1 | 11/2019 | Wheatley et al. |

* cited by examiner

ARTICLE AND METHOD OF MANUFACTURE THEREOF

CROSS REFERENCE TO RELATED APPLICATIONS

This application is a national stage filing under 35 U.S.C. 371 of PCT/IB2021/061885, filed Dec. 16, 2021, which claims the benefit of Provisional Application No. 63/138, 938, filed Jan. 19, 2021, the disclosures of which are incorporated by reference in their entireties herein.

TECHNICAL FIELD

The present disclosure relates generally to an article and a method of manufacturing such articles.

BACKGROUND

A light control film (LCF), also known as a light colli- mating film, is an optical film that is configured to regulate transmission of light, often to obscure what is being viewed from others (for example, privacy films). LCFs typically include a light transmissive film having a plurality of parallel grooves. The grooves are generally filled with a light-absorbing material.

The LCFs may be placed proximate a display surface, an image surface, or other surfaces to be viewed. At normal incidence, when viewer is looking at an image through the LCF in a direction that is perpendicular to the display surface, the image is viewable. Typically, an image can be viewed through the LCFs only when the viewer is positioned within a range of angles referred to as the "viewing angle". As the viewer moves outside a range of viewing angles, the amount of light transmitted through the LCF decreases until a viewing cutoff angle is reached where substantially all the light is blocked by the light-absorbing material and the image is no longer viewable. Therefore, the LCFs control angular light emissions from the display surfaces and pro- vide privacy to the viewer by blocking observation by others that are outside the range of viewing angles. The LCFs may also prevent unwanted light reflections from automotive windows. The LCFs may be also used to camouflage roof top solar panels.

SUMMARY

Generally, the present disclosure relates to an article. The present disclosure also relates to a method of manufacturing such articles.

In a first aspect, the present disclosure provides an article. The article includes a first microstructured layer including a plurality of first microstructures forming a plurality of first grooves therebetween. The article further includes a second microstructured layer including a plurality of second micro- structures disposed adjacent to the plurality of first micro- structures. The plurality of second microstructures forms a plurality of second grooves therebetween. The article further includes a light absorbing material disposed in at least each of the plurality of first grooves and each of the plurality of second grooves. The light absorbing material bonds the first microstructured layer to the second microstructured layer.

In a second aspect, the present disclosure provides a display including the article of the first aspect.

In a third aspect, the present disclosure provides an article. The article includes a first microstructured layer including a plurality of first microstructures forming a plurality of first grooves therebetween. The article further includes a second microstructured layer including a plurality of second microstructures disposed adjacent to the plurality of first microstructures. The plurality of second microstruc- tures forms a plurality of second grooves therebetween. The article further includes a light absorbing material disposed in at least each of the plurality of the first grooves and each of the plurality of second grooves. The light absorbing material bonds the first microstructured layer to the second micro- structured layer. No additional adhesive material is disposed between the first microstructured layer and the second microstructured layer.

In a fourth aspect, the present disclosure provides a method of manufacturing an article. The method includes providing a first microstructured layer. The first microstruc- tured layer includes a plurality of first microstructures forming a plurality of first grooves therebetween. The method further includes providing a second microstructured layer. The second microstructured layer includes a plurality of second microstructures forming a plurality of second grooves therebetween. The method further includes filling at least the plurality of first grooves and the plurality of second grooves with a light absorbing material and bonding the first microstructured layer to the second microstructured layer with the light absorbing material.

BRIEF DESCRIPTION OF THE DRAWINGS

Exemplary embodiments disclosed herein may be more completely understood in consideration of the following detailed description in connection with the following fig- ures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
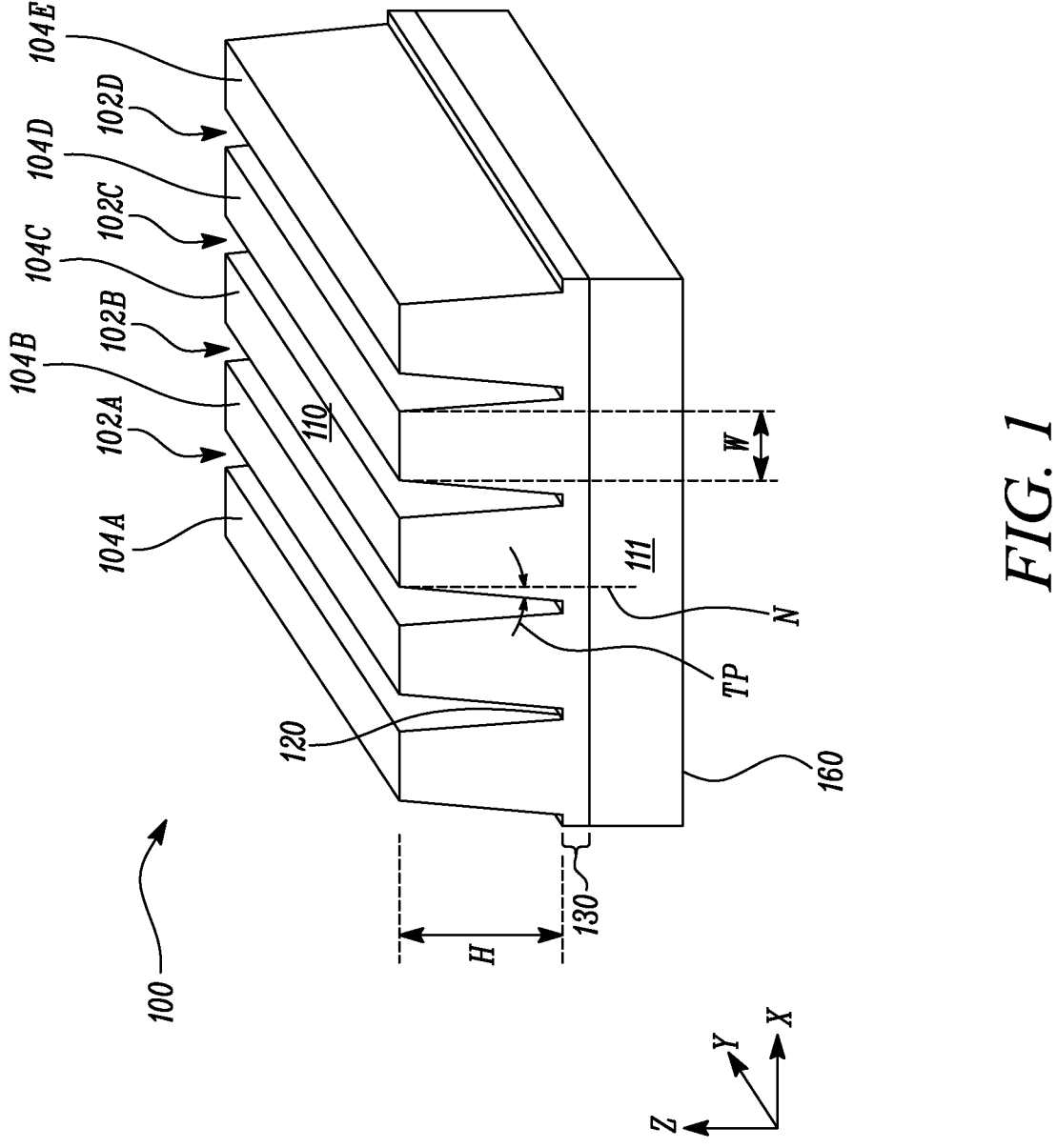
FIG. 1 shows a schematic perspective view of a micro- structured layer according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure is directed to an article, also known as a light control film (LCF). The present disclosure further relates to a method of manufacturing such articles.

The article of the present disclosure may be used in various optical applications, such as imaging applications, displays, and so forth. The article controls angular light emissions from emission surfaces, such as a display surface, an image surface, or other surfaces to be viewed, and provides privacy to a viewer by blocking observation by others that are outside a range of a viewing angle. The article may also be used to prevent or reduce unwanted light reflections from automotive windows. The article may also be used to prevent light from being directed towards reflective or potentially glare-producing surfaces, for example, a nearby windshield positioned at an angle with respect to a display in a vehicle. The article may further be used to camouflage rooftop solar panels.

The article includes a first microstructured layer and a second microstructured layer. The first microstructured layer includes a plurality of first microstructures forming a plurality of first grooves therebetween. The second microstructured layer includes a plurality of second microstructures disposed adjacent to the plurality of first microstructures. The plurality of second microstructures forms a plurality of second grooves therebetween. The article further includes a light absorbing material disposed in at least each of the plurality of first grooves and each of the plurality of second grooves. The light absorbing material bonds the first microstructured layer to the second microstructured layer.

The article of the present disclosure may allow control of the viewing angle by changing aspect ratios (i.e., a ratio of a height to a width) of the pluralities of first and second microstructures of the first and second microstructured layers, respectively. The article of the present disclosure may further allow controlling the viewing angle by changing a skew angle between the pluralities of first and second microstructures of the respective first and second microstructured layers. For example, if the pluralities of first and second microstructures are perpendicular to each other, nearly rotationally symmetric performance may be observed. If the pluralities of first and second microstructures have a skew angle between 0 degree and 90 degrees, non-symmetric viewing angles may be observed. The non-symmetric viewing angles may be desirable in some applications.

Moreover, since the light absorbing material bonds the first microstructured layer to the second microstructured layer, the article may not include any additional adhesive material disposed between the first microstructured layer and the second microstructured layer. This may further reduce cost and complexity of manufacturing the article. The method of manufacturing the article may further require less time.

In addition, the article of the present disclosure may achieve a high aspect ratio, may reduce ghost image formation, and may be adaptable to many different absorbing element shapes, sizes, and spacings, depending on the desired application attributes.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, the term "viewing angle" is defined with respect to a normal to a plane of the article as the range of angles over which the article is substantially transmissive. In some cases, the viewing angle is centered with respect to the normal of the plane of the article. In some other cases, the viewing angle may not be centered at the normal of the plane of the article, and may instead be off-center with respect to the normal. For example, the viewing angle of the article may be defined as a range of angles over which the transmission of the article is within 60%, or within 50%, or within 40%, or within 20%, or within 10%, or within 5% of a peak transmission.

As used herein, when a first material is termed as "similar" to a second material, at least 90 weight % of the first and second materials are identical and any variation between the first and second materials comprises less than about 10 weight % of each of the first and second materials.

Referring now to the Figures, FIG. 1 shows a microstructured layer 100 including a plurality of microstructures 104A-104E (collectively, the plurality of microstructures 104) in accordance with an embodiment of the present disclosure. The plurality of microstructures 104 forms a plurality of grooves 102A-102D (collectively, the plurality of grooves 102) therebetween. Specifically, the groove 102A is formed between the adjacent microstructures 104A, 104B. The groove 102B is formed between the adjacent microstructures 104B, 104C. The groove 102C is formed between the adjacent microstructures 104C, 104D. The groove 102D is formed between the adjacent microstructures 104D, 104E.

The microstructured layer 100 further includes a base layer 111. The base layer 111 may be integrally formed with, or separately added to the microstructured layer 100 (whether by extrusion, cast-and-cure, or some other method).

In some embodiments, the base layer 111 may include, for example, polyethylene terephthalate, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefinbased material such as cast or orientated films of polyethylene, polypropylene, and polycyclo-olefins, polyimides, and glass. Optionally, the base layer 111 may include mixtures or combinations of these materials.

In some embodiments, the plurality of microstructures 104 may be formed on the base layer 111 by various methods, such as extrusion, cast-and-cure, coating, or some other method. In some cases, the plurality of microstructures 104 may be micro-replicated on the base layer 111. A typical micro-replication process includes depositing a polymerizable composition onto a master negative microstructured molding surface in an amount barely sufficient to fill the cavities of the master. The master can be metallic, such as nickel, chrome- or nickel-plated copper or brass, or can be a thermoplastic material that is stable under the polymerization conditions and has a surface energy that allows clean removal of the polymerizable composition from the master. The cavities are then filled by moving a bead of the polymerizable composition between a preformed base or substrate layer (for example, the base layer 111) and the master. The composition is then cured.

In some embodiments, the plurality of microstructures 104 may have a transmittance of, for example, greater than about 70%, greater than about 80%, or greater than about 90% in the visible light spectrum. In some embodiments, the plurality of microstructures 104 is made of a polymerizable resin. In some cases, the polymerizable resin may be optically clear having a substantially high transmission in a wavelength range from about 300 nanometers (nm) to about 800 nm. The polymerizable resin may include a combination of a first polymerizable component and a second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition may include a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin.

In some embodiments, the plurality of microstructures 104 are joined to the base layer 111. In some embodiments, a land 130 may be present between a base 120 of the plurality of grooves 102 and the base layer 111. In some embodiments, the land 130 may be formed during the micro-replication process. The land 130 may be a continuous land or a discontinuous land. In some embodiments, the land 130 has a thickness less than about 20 microns (μm), or less than about 10 μm.

In some embodiments, the plurality of microstructures 104 further defines a structured surface 110. In some embodiments, the base layer 111 further defines a non-structured surface 160 opposite to the structured surface 110. In some embodiments, the non-structured surface 160 may be substantially planar.

As illustrated in FIG. 1, the plurality of microstructures 104 defines mutually orthogonal X, Y and Z-axes. The X and Y-axes are in-plane axes of the plurality of microstructures 104, while the Z-axis is a transverse axis disposed along thicknesses of the plurality of microstructures 104. In other words, the X and Y-axes are disposed along plane of the structured surface 110, while the Z-axis is perpendicular to the plane of the structured surface 110. In the illustrated embodiment of FIG. 1, the plurality of microstructures 104A-104E are substantially parallel to each other. Specifically, the plurality of microstructures 104A-104E are substantially parallel to each other along the Y-axis.

Each of the plurality of microstructures 104 has a height H excluding the land 130 and a minimum width W at narrowest portion. In some embodiments, the height H of the plurality of microstructures 104 may be in a range from about 50 μm to about 200 jun. In some embodiments, the height H may be greater than about 75 μm, greater than about 100 μm, greater than about 120 μm, greater than about 150 μm, or greater than about 250 μm. In some embodiments, the minimum width W of the plurality of microstructures 104 may be in a range from about 2 μm to about 50 μm. In some embodiments, the minimum width W may be greater than about 1 μm, greater than about 5 μm, greater than about 10 μm, greater than about 25 μm, or greater than about 75 μm. An aspect ratio H/W may be defined as a ratio of the height H to the width W. In other words, the aspect ratio H/W may be defined as the height H of the plurality of microstructures 104 divided by the minimum width W of the plurality of microstructures 104. In some embodiments, the plurality of microstructures 104 has the aspect ratio H/W in a range from about 1.2 to about 7.9. In some embodiments, the plurality of microstructures 104 has the aspect ratio H/W in a range from about 1.1 to 13.5. In some embodiments, the aspect ratio H/W is in a range from about 1.5 to 15.

In the illustrated embodiment, each microstructure 104 is tapered from the base 120. Further, each microstructure 104 defines a taper angle TP with respect to a normal N to the base 120. The normal N may be disposed along the Z-axis. Therefore, each microstructure 104 may define the taper angle TP with respect to the Z-axis. In some embodiments, the taper angle TP is less than about 5 degrees, less than about 10 degrees, less than about 15 degrees, less than about 20 degrees, less than about 30 degrees, or less than about 45 degrees. Due to the taper angle TP, each microstructure 104 has the minimum width W at the structured surface 110 and a maximum width (not shown) at the base 120. However, in some other embodiments, the microstructures 104 may not have any taper (i.e., the taper angle TP=0 degree) and each microstructure 104 has a substantially uniform width along its height. In such cases, the minimum width W is equal to the uniform width of each microstructure 104.

Figure 2:
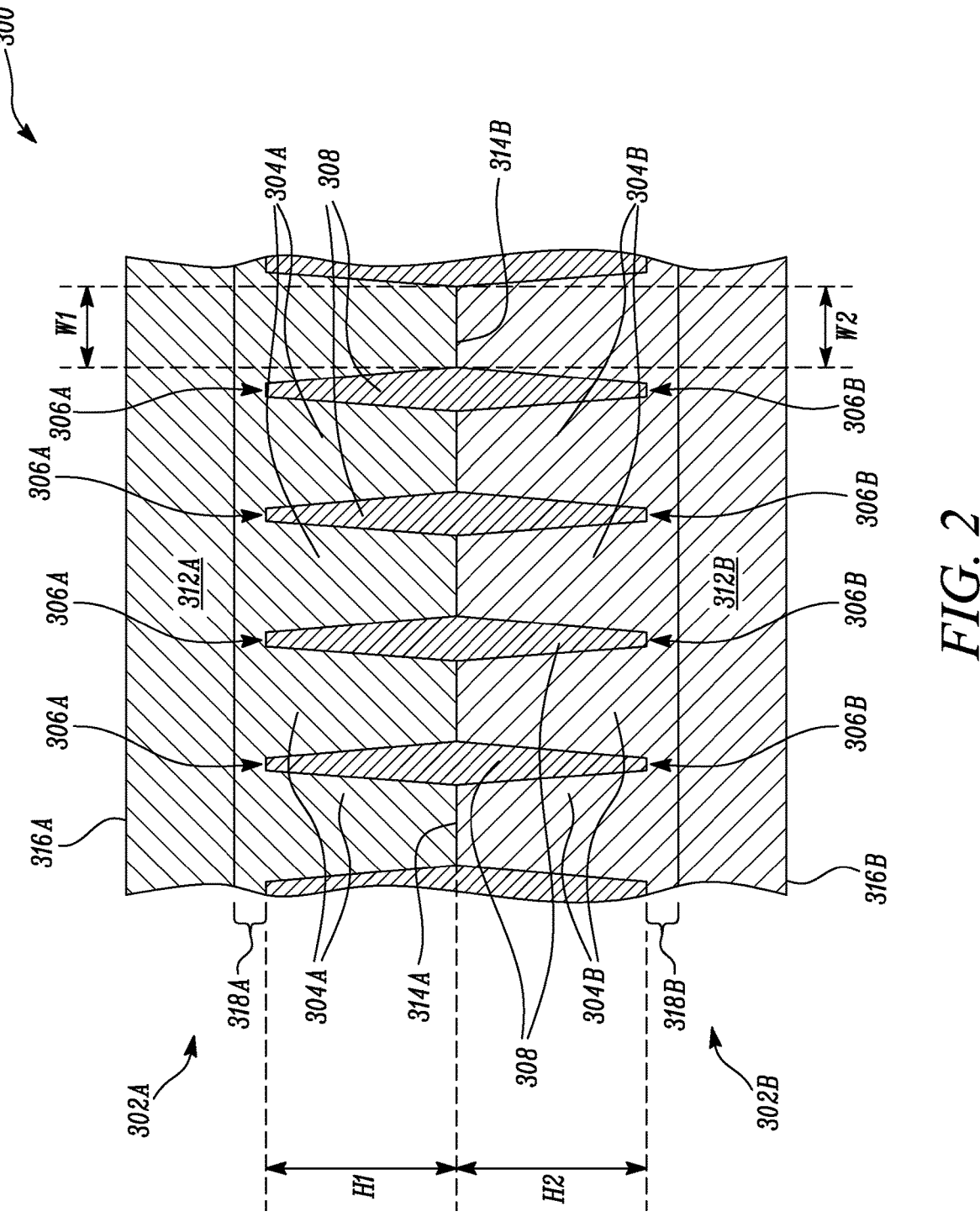
FIG. 2 shows a schematic cross-sectional view of an article according to an embodiment of the present disclo- sure.

FIG. 2 shows a cross-section of an article 300 according to an embodiment of the present disclosure. The article 300 includes a first microstructured layer 302A and a second microstructured layer 302B. Each of the first microstructured layer 302A and the second microstructured layer 302B may be substantially similar to the microstructured layer 100 illustrated in FIG. 1.

The first microstructured layer 302A includes a plurality of first microstructures 304A forming a plurality of first grooves 306A therebetween. In other words, each first groove 306A is defined between two corresponding adjacent first microstructures 304A. In some embodiments, the plurality of first grooves 306A includes at least one of a square shape, a rectangular shape, a curved shape, a trapezoidal shape, and a polygonal shape. However, the plurality of first grooves 306A may have any suitable shape, geometry, and dimensions, as per desired application attributes.

The second microstructured layer 302B includes a plurality of second microstructures 304B disposed adjacent to the plurality of first microstructures 304A. The plurality of second microstructures 304B forms a plurality of second grooves 306B therebetween. In other words, each second groove 306B is defined between two corresponding adjacent second microstructures 304B. In some embodiments, the plurality of first grooves 306A includes at least one of a square shape, a rectangular shape, a curved shape, a trapezoidal shape, and a polygonal shape. However, the plurality of second grooves 306B may have any suitable shape, geometry, and dimensions, as per desired application attributes.

In some embodiments, the plurality of first grooves 306A and the plurality of second grooves 306B may have the same or different dimensions (height, width, and/or spacings), and the same or different geometries.

The first microstructured layer 302A and the second microstructured layer 302B may be substantially transmissive of light within a desired range of wavelengths or spectral range, such as the visible spectrum or a portion thereof. In some embodiments, the first microstructured layer 302A and the second microstructured layer 302B may be made of substantially transparent materials. In some embodiments, the first microstructured layer 302A and the second microstructured layer 302B may be made of the same material(s) or may be made of materials that have the same or nearly the same refractive index. In some embodiments, matching or nearly matching refractive indices may help to reduce reflections at interfaces between materials, thereby reducing ghosting effects. In some other embodiments, the first microstructured layer 302A and the second microstructured layer 302B may be made of different material(s) having different refractive indices. In some embodiments, each of the plurality of first microstructures 304A has a first refractive index and each of the plurality of second microstructures 304B has a second refractive index. In some embodiments, each of the first refractive index and the second refractive index is in a range from about 1.44 to about 1.66. In some other embodiments, each of the first refractive index and the second refractive index is in a range from about 1.5 to about 1.7.

In some embodiments, each of the plurality of first microstructures 304A defines a first height H1, a first width W1, and a first aspect ratio H1/W1 as a ratio of the first height H1 to the first width W1. The first width W1 is defined at the narrowest portion of the plurality of first microstructures 304A. Specifically, the first width W1 corresponds to a minimum width of the first microstructures 304A. In the illustrated embodiment, due to tapered configuration of each first microstructure 304A, the first width W1 is measured at a first structured surface 314A. However, in some other embodiments, each first microstructure 304A may have a substantially uniform width, such as the first width W1 is equal to the uniform width of the first microstructures 304A.

In some embodiments, the first height H1 of the plurality of first microstructures 304A may be in a range from about 50 μm to about 200 μm. In some embodiments, the first height H1 may be greater than about 75 μm, greater than about 100 μm, greater than about 120 μm, greater than about 150 μm, or greater than about 250 μm. In some embodiments, the first width W1 of the plurality of first microstructures 304A may be in a range from about 2 μm to about 50 μm. In some embodiments, the minimum width W may be greater than about 1 μm, greater than about 5 μm, greater than about 10 μm, greater than about 25 μm, or greater than about 75 μm. In some embodiments, the first aspect ratio H1/W1 is in a range from about 1.2 to about 7.9. In some embodiments, the first aspect ratio H1/W1 is in a range from about 1.1 to about 13.5.

In some embodiments, each of the plurality of second microstructures 304B defines a second height H2, a second width W2, and a second aspect ratio H2/W2 as a ratio of the second height H2 to the second width W2. The second width W2 is defined at the narrowest portion of the plurality of second microstructures 304B. Specifically, the second width W2 corresponds to a minimum width of the second microstructures 304B. In the illustrated embodiment, due to tapered configuration of each second microstructure 304B, the second width W2 is measured at a second structured surface 314B. However, in some other embodiments, each second microstructure 304B may have a substantially uniform width, such as the second width W2 is equal to the uniform width of the second microstructures 304B.

In some embodiments, the second height H2 of the plurality of second microstructures 304B may be in a range from about 50 μm to about 200 μm. In some embodiments, the second height H2 may be greater than about 75 μm, greater than about 100 μm, greater than about 120 μm, greater than about 150 μm, or greater than about 250 μm. In some embodiments, the second width W2 of the plurality of second microstructures 304B may be in a range from about 2 μm to about 50 jun. In some embodiments, the second width W2 may be greater than about 1 μm, greater than about 5 μm, greater than about 10 μm, greater than about 25 μm, or greater than about 75 μm. In some embodiments, the second aspect ratio H2/W2 is in a range from about 1.2 to about 7.9. In some embodiments, the second aspect ratio H2/W2 is in a range from about 1.1 to about 13.5. In some embodiments, the second aspect ratio H2/W2 is in a range from about 1.5 to 15.

In some embodiments, the first aspect ratio H1/W1 of the plurality of first microstructures 304A is substantially equal to the second aspect ratio H2/W2 of the plurality of second microstructures 304B. In some other embodiments, the first aspect ratio H1/W1 of the plurality of first microstructures 304A may be different from the second aspect ratio H2/W2 of the plurality of second microstructures 304B.

In the illustrated embodiment, the first microstructured layer 302A further includes a first base layer 312A. In some embodiments, the plurality of first microstructures 304A is joined to the first base layer 312A. The plurality of first microstructures 304A further defines the first structured surface 314A and the first base layer 312A defines a first non-structured surface 316A opposite to the first structured surface 314A.

In the illustrated embodiment, the second microstructured layer 302B further includes a second base layer 312B. In some embodiments, the plurality of second microstructures 304B is joined to the second base layer 312B. The plurality of second microstructures 304B further defines the second structured surface 314B and the second base layer 312B defines a second non-structured surface 316B opposite to the second structured surface 314B. In some embodiments, each of the first non-structured surface 316A and the second non-structured surface 316B is substantially planar.

In some embodiments, the article 300 further includes a first land 318A disposed between the first base layer 312A and the plurality of first microstructures 304A. In some embodiments, the article 300 further includes a second land 318B disposed between the second base layer 312B and the plurality of second microstructures 304B.

The article 300 further includes a light absorbing material 308 disposed in at least each of the plurality of first grooves 306A and each of the plurality of second grooves 306B. The light absorbing material 308 bonds the first microstructured layer 302A to the second microstructured layer 302B. In some embodiments, the light absorbing material 308 further bonds the first structured surface 314A to the second structured surface 314B. In other words, no additional adhesive material is disposed between the first microstructured layer 302A and the second microstructured layer 302B. In some embodiments, the article 300 further includes a layer (not shown) of the light absorbing material 308 disposed between the plurality of first microstructures 304A and the plurality of second microstructures 304B. In some embodiments, no other material apart from the light absorbing material 308 is disposed between the first microstructured layer 302A and the second microstructured layer 302B.

Since the light absorbing material 308 bonds the first microstructured layer 302A to the second microstructured layer 302B, the article 300 may not include any additional adhesive material disposed between the first microstructured layer 302A and the second microstructured layer 302B. This may further reduce a cost and a complexity of manufacturing the article 300. A method of manufacturing the article 300 may further require less time.

In some embodiments, the light absorbing material 308 includes a binder, and one or more of a light absorbing dye, a light absorbing pigment, a light absorbing bead, a light absorbing particle, and a carbon black dispersed in the binder. In some embodiments, the binder includes one or more of acrylate, polyethylene terephthalate (PET), polycarbonate, polymethylmethacrylate (PMMA), polyvinyl chloride (PVC), polyvinyl alcohol (PVA), polyolefin, polyethylene, polyethylene naphthalate, cellulose acetate, polystyrene, and polyimide. In some embodiments, the binder includes a radiation cured resin or a thermally cured resin.

The plurality of first grooves 306A and the plurality of second grooves 306B may be rendered light absorbing by filling the plurality of first grooves 306A and the plurality of second grooves 306B with the light absorbing material 308. The term "light absorbing", as used in the present disclosure, refers to regions in the first microstructured layer 302A and the second microstructured layer 302B of the article 300 that are intended to substantially block the transmission of light within a desired spectral range. The light absorbing material 308 may include materials that primarily function to absorb light and/or materials that primarily function to scatter (or disperse) light. Therefore, the plurality of first grooves 306A and the plurality of second grooves 306B and the light absorbing material 308 disposed therebetween form a plurality of light absorbing regions.

In some embodiments, positions of the light absorbing regions of the first microstructured layer 302A and the second microstructured layer 302B may be coincident, may be offset by a desired amount, or may vary between aligned and offset over different areas of the article 300.

In the illustrated embodiment of FIG. 2, the light absorbing regions of the first microstructured layer 302A and the second microstructured layer 302B are similarly shaped and similarly spaced. In some other embodiments, the light absorbing regions of the first microstructured layer 302A and the second microstructured layer 302B may have different shapes and spacings. In some embodiments, the first microstructured layer 302A and the second microstructured layer 302B may be adjacently disposed so that the light absorbing regions may be generally aligned. In some embodiments, the first microstructured layer 302A and the second microstructured layer 302B may be adjacently disposed so that the light absorbing regions may at least be partially aligned. In some embodiments, each pair of the at least partially aligned light absorbing regions may be considered as a single light absorbing region of the article 300.

The article 300 may be used in various optical applications, such as imaging applications, displays, and so forth. In some embodiments, the article 300 may be used in other optical devices. In some other embodiments, the article 300 may be used in various automotive and solar applications.

Figure 3:
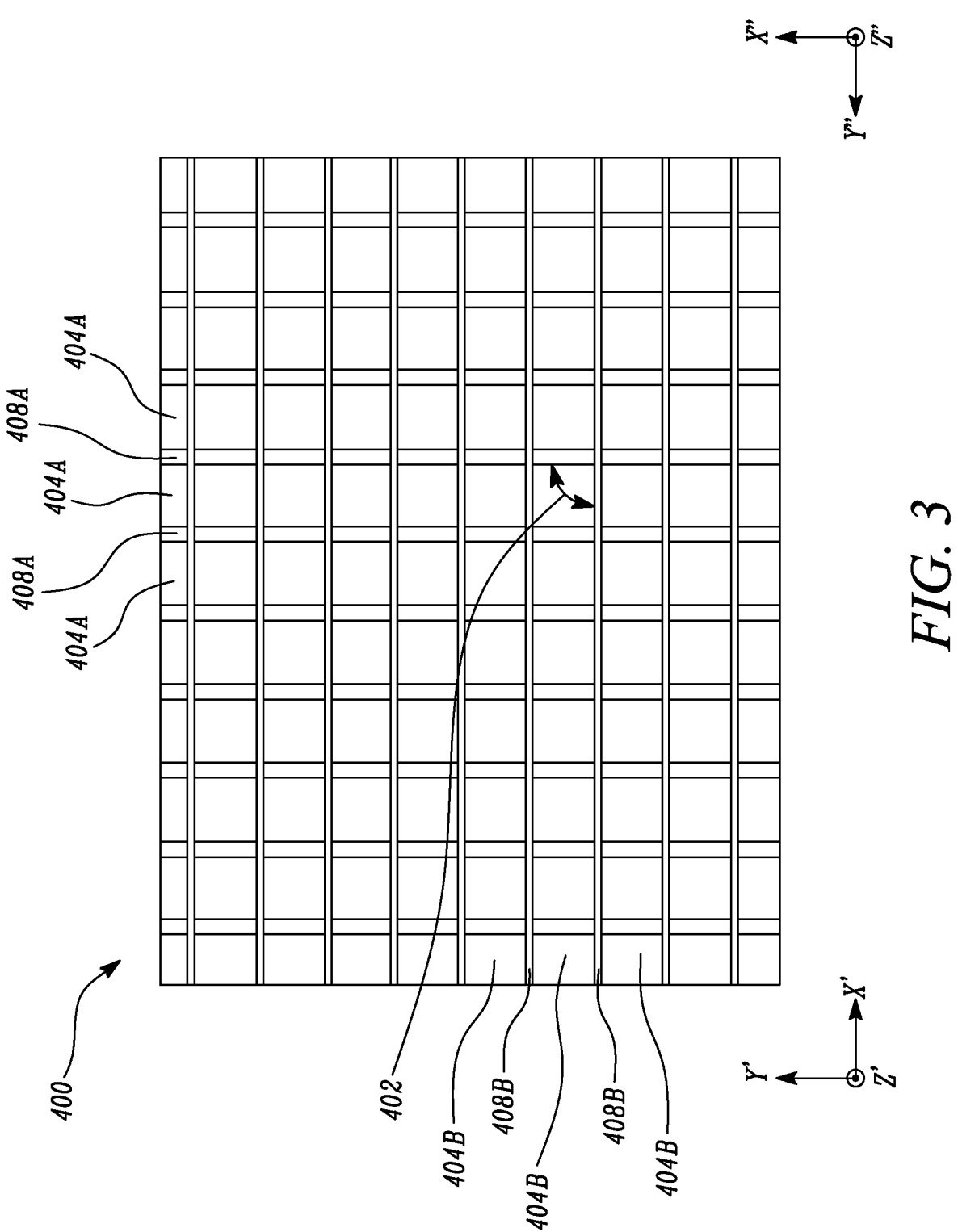
FIG. 3 shows a schematic top view of an article according to an embodiment of the present disclosure.

FIG. 3 illustrates an article 400. The article 400 is substantially similar to the article 300 illustrated in FIG. 2, with equivalent numbers used to represent like elements. Some elements of the article 300 of FIG. 2 are not shown in the article 400 of FIG. 3 for the purpose of clarity.

The article 400 includes a plurality of first microstructures 404A and a plurality of second microstructures 404B. The article 400 further includes a plurality of first light absorbing regions 408A and a plurality of second light absorbing regions 408B. The plurality of first microstructures 404A and the plurality of first light absorbing regions 408A define mutually orthogonal X', Y' and Z'-axes. The X' and Y'-axes are co-planer with a structured surface of the plurality of first microstructures 404A and the plurality of first light absorbing regions 408A. The plurality of second microstructures 404B and the plurality of second light absorbing regions 408B define mutually orthogonal X", Y" and Z"-axes. The X" and Y" axes are co-planer with a structured surface of the plurality of second microstructures 404B and the plurality of second light absorbing regions 408B. Each first absorbing region 408A is disposed between corresponding two adjacent first microstructures 404A. The first absorbing regions 408A extend substantially parallel to the first microstructures 404A. Referring to FIG. 3, in an example, both the first microstructures 404A and the first absorbing regions 408A extend along the Y'-axis. Each second absorbing region 408B is disposed between corresponding two adjacent second microstructures 404B. The second absorbing regions 408B extend substantially parallel to the second microstructures 404B. Referring to FIG. 3, in an example, both the second microstructures 404B and the second absorbing regions 408B extend along the Y"-axis.

FIG. 3 illustrates a skew angle 402 between Y' and Y"-axes. A skew angle is defined between the plurality of first microstructures 404A and the plurality of second microstructures 404B. In the illustrated embodiment of FIG. 3, the skew angle 402 is shown between the plurality of first light absorbing regions 408A and the plurality of second light absorbing regions 408B. The skew angle between the plurality of first microstructures 404A and the plurality of second microstructures 404B may be substantially similar to the skew angle 402. In this embodiment, the skew angle 402 is about 90 degrees. However, in some other embodiments, the skew angle 402 between the plurality of first microstructures 404A and the plurality of second microstructures 404B may be greater than or equal to 0 degree and less than about 90 degrees.

Figure 4:
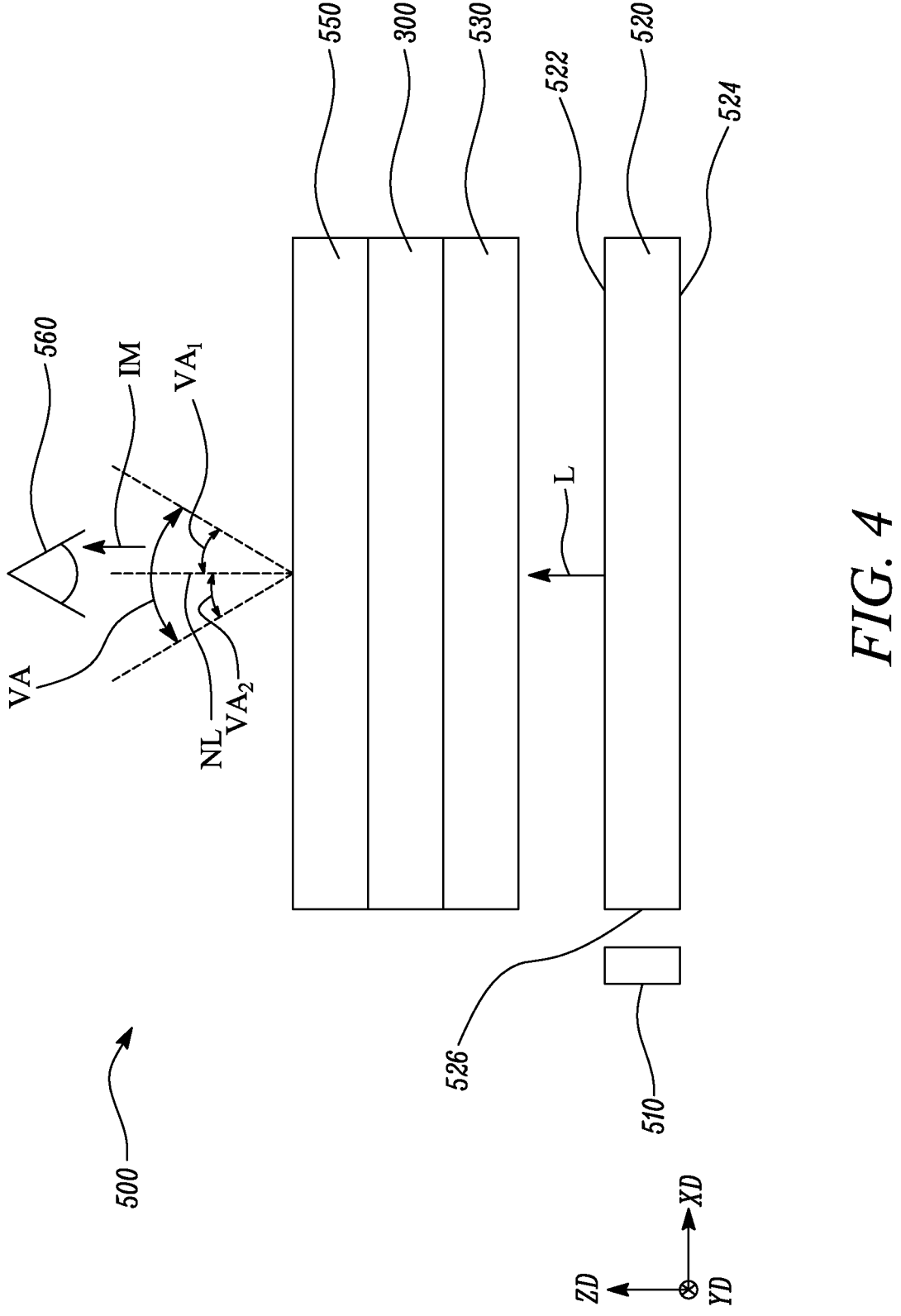
FIG. 4 shows a schematic cross-sectional view of a display according to an embodiment of the present disclo- sure.

FIG. 4 shows a cross-sectional view of a display 500 according to an embodiment of the present disclosure. The display 500 includes at least one light source 510, an illumination source 520, a display panel 530 and the article 300. In other embodiments, the display may be an emissive display such an organic light emitting diode (OLED) display that does not require a separate light source and illumination source. In some embodiments, the display 500 may include the article 400 shown in FIG. 3. Internal elements of the article 300 are not shown in FIG. 4 for the purpose of clarity.

The display 500 defines mutually orthogonal XD, YD and ZD-axes. The XD and YD-axes are in-plane axes of the display 500, while the ZD-axis is a transverse axis disposed along a thickness of the display 500. In other words, the XD and YD-axes are disposed along a plane of the display 500, while the ZD-axis is perpendicular to the plane of the display 500. The illumination source 520, the display panel 530, and the article 300 of the display 500 are disposed adjacent to each other along the ZD-axis.

In some embodiments, the display panel 530 and the article 300 are bonded together, for example, by means of an optical adhesive, epoxy, lamination, or any other suitable method of attachment.

The illumination source 520 is configured to emit light L from an emission surface 522 of the illumination source 520.

The illumination source 520 includes the at least one light source 510. The at least one light source 510 generates light that illuminate the display 500. In some embodiments, the at least one light source 510 includes one or more light emitters which emit light. The light emitters may be, for example, light emitting diodes (LEDs), fluorescent lights, or any other suitable light emitting device. The LEDs may be monochromatic or may include a number of emitters operating at different wavelengths in order to produce a white light output. In the illustrated embodiment of FIG. 4, the at least one light source 510 is disposed at an edge surface 526 of the illumination source 520. In some other embodiments, the at least one light source 510 may be located proximate a longitudinal surface 524 opposite to the emission surface 522 of the illumination source 520.

The display panel 530 is configured to receive light L from the emission surface 522 of the illumination source 520 and emit an image IM for viewing by a viewer 560 through the article 300. The image IM may be viewed through the article 300 only when the viewer 560 is positioned within a viewing angle VA. The viewing angle VA may be defined with respect to a normal NL to the display 500. The normal NL may further correspond to a normal to the article 300. The viewing angle VA may be defined as a range of angles over which the transmission of the article 300 is within 60%, or within 50%, or within 40%, or within 20%, or within 10%, or within 5% of a peak transmission. The viewing angle VA includes a viewing half angle $VA_1$ and a viewing half angle $VA_2$ measured from the normal NL to the display 500. The viewing angle VA is equal to the sum of the viewing half angle $VA_1$ and the viewing half angle $VA_2$ each of which are measured from the normal NL to the display 500. Therefore, the article 300 controls angular light emissions from the display panel 530 and provides privacy to the viewer 560 by blocking observation by others that are outside the viewing angle. The article 300 may further control the viewing angle VA in a three-dimensional space. For example, the viewing angle VA may be a solid angle defined about the normal NL. In some cases, the viewing angle VA may vary about the normal NL in the three-dimensional space.

In some embodiments, the article 300 may allow control of the viewing angle VA by varying the first aspect ratio H1/W1 and/or the second aspect ratio H2/W2 of the pluralities of first and second microstructures 304A, 304B of the first and second microstructured layers 302A, 302B, respectively (shown in FIG. 2). In other words, the viewing angle of the article 300 may be controlled by adjusting the aspect ratio of the microstructures 304A, 304B of each of the first and second microstructured layers 302A, 302B. The viewing angle VA may also be controlled by varying the skew angle. Thus, the viewing angle VA may be controlled by varying either (or both) of the first and second aspect ratios H1/W1, H2/W2, by varying the skew angle, or by varying either (or both) of the first and second aspect ratios H1/W1, H2/W2 in combination with varying the skew angle.

In some embodiments, the display 500 may further include an optional cover layer 550. In some embodiments, the optional cover layer 550 and the article 300 are bonded together, for example, by means of an optical adhesive, epoxy, lamination, or any other suitable method of attachment.

In some embodiments, the optional cover layer 550 may include an anti-glare coating, an anti-reflective coating, an anti-soiling coating, or combinations thereof. In some embodiments, the relative brightness ratio of the display 500 may be greatest along the normal NL to the display 500 (referred to as the "axial brightness") and may decrease as the polar angle increases.

Figure 5:
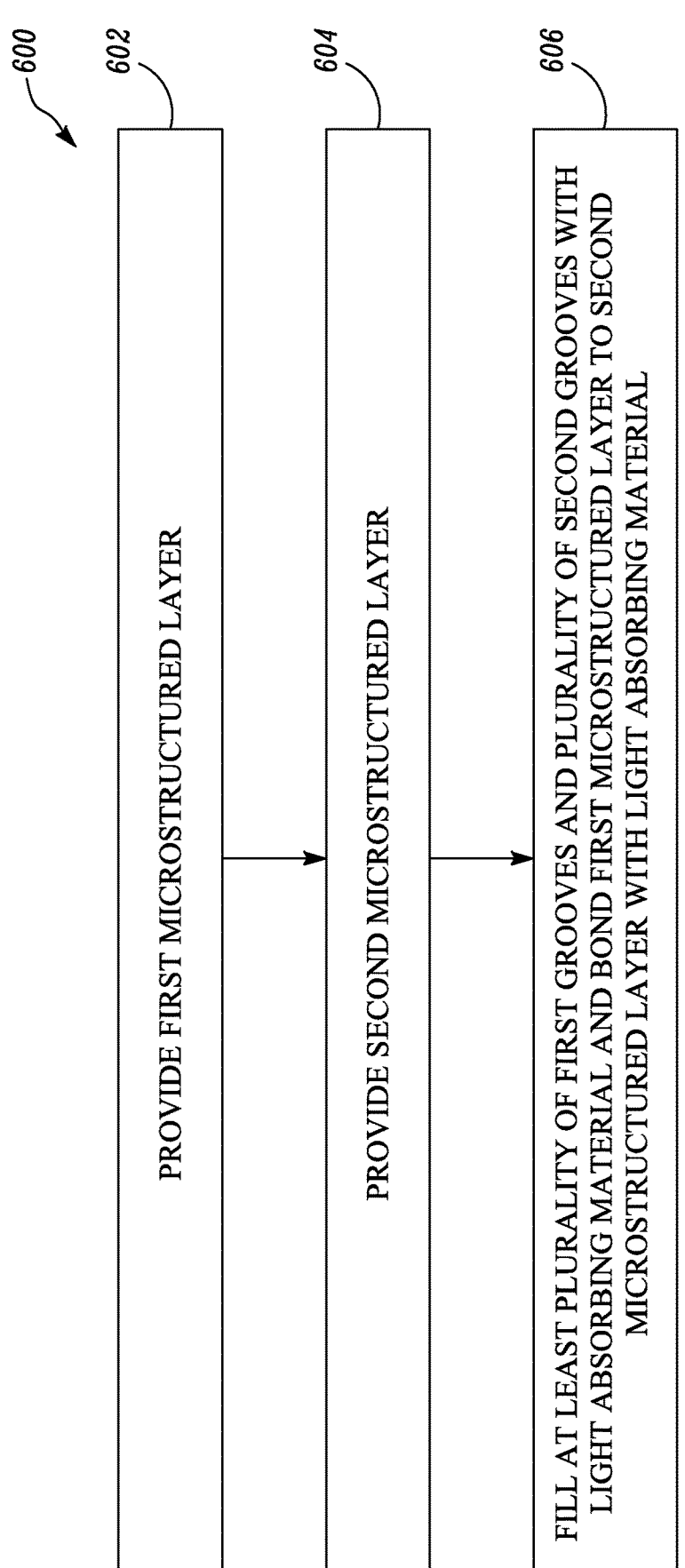
FIG. 5 shows a flowchart of a method of manufacturing an article according to an embodiment of the present dis- closure.

FIG. 5 schematically shows an exemplary method 600 of manufacturing an article of the present disclosure. The article may be any one of the article 300, or the article 400, illustrated in FIGS. 2 and 3, respectively. The method 600 will be described with reference to the article 300 of FIG. 2 and FIGS. 6A-6C.

A machine direction MD may be a general direction along which a film or a layer travels during a process, such as a process of manufacturing. A transverse direction TD may be a second axis within a plane of the film or the layer and may be orthogonal to the machine direction MD. A normal direction ND may be orthogonal to both the machine direction MD and the transverse direction TD and correspond generally to the thickness of the film or the layer.

Figures 6A, 6B, 6C:
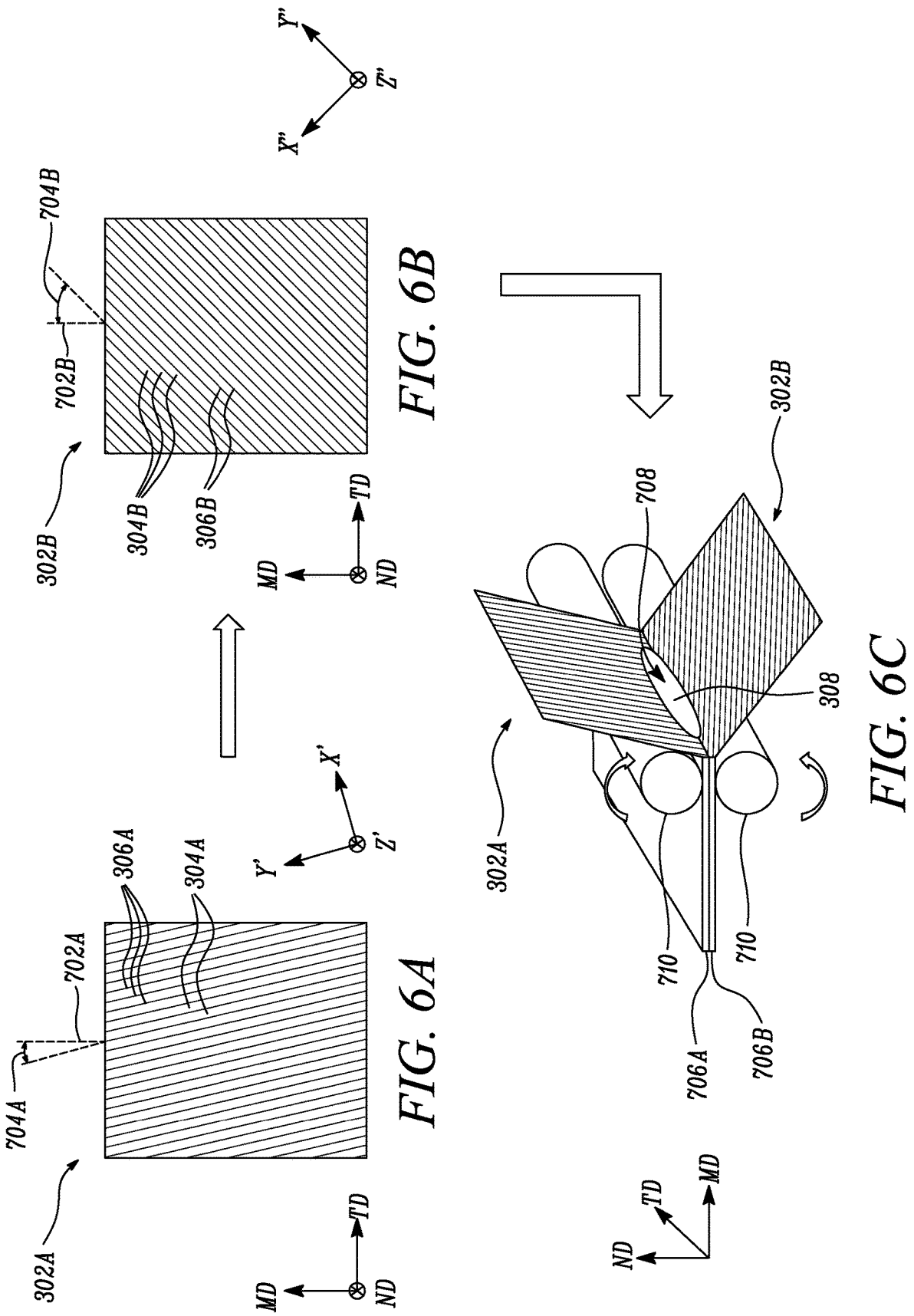
FIGS. 6A-6C show a manufacturing process of an article according to an embodiment of the present disclosure.

At step 602, the method 600 includes providing the first microstructured layer 302A (shown in FIG. 6A). The first microstructured layer 302A includes the plurality of first microstructures 304A forming the plurality of first grooves 306A (illustrated as straight lines) therebetween and extending along the Y'-axis. In some embodiments, the first microstructured layer 302A further defines a first longitudinal axis 702A along the machine direction MD. The first longitudinal axis 702A is defined along a length of the first microstructured layer 302A. A first bias angle 704A is defined between the Y'-axis and the machine direction MD. In other words, the first bias angle 704A is defined between the plurality of first microstructures 304A and the machine direction MD. In some embodiments, the first bias angle 704A is greater than or equal to −90 degrees and less than about 90 degrees.

At step 604, the method 600 further includes providing the second microstructured layer 302B (shown in FIG. 6B). The second microstructured layer 302B includes the plurality of second microstructures 304B forming the plurality of second grooves 306B (illustrated as straight lines) therebetween extending along the Y''-axis. In some embodiments, the second microstructured layer 302B further defines a second longitudinal axis 702B along the machine direction MD. The second longitudinal axis 702B may be defined along a length of the second microstructured layer 302B. A second bias angle 704B may be defined between the Y''-axis and the machine direction MD. In other words, the second bias angle 704B may be defined between the plurality of second microstructures 304B and the machine direction MD. In some embodiments, the second bias angle 704B is greater than or equal to −90 degrees and less than about 90 degrees.

In some embodiments, the method 600 further includes placing the plurality of first microstructures 304A adjacent to the plurality of second microstructures 304B.

In some embodiments, the method 600 further includes providing a skew angle (for example, the skew angle 402 shown in FIG. 3) between the plurality of first microstructures 304A and the plurality of second microstructures 304B. In some embodiments, the skew angle may be greater than or equal to 0 degree and less than or equal to 90 degrees. The skew angle between the first and second microstructures 304A, 304B may be defined along a plane of the first microstructured layer 302A or the second microstructured layer 302B.

In some embodiments, the skew angle may be a result of providing the first microstructured layer 302A and the second microstructured layer 302B at the first and second bias angles 704A, 704B, respectively.

At step 606, the method 600 further includes filling at least the plurality of first grooves 306A and the plurality of second grooves 306B with the light absorbing material 308 and bonding the first microstructured layer 302A to the second microstructured layer 302B with the light absorbing material 308 (shown in FIG. 6C).

In some embodiments, placing the plurality of first microstructures 304A adjacent to the plurality of second microstructures 304B and filling at least the plurality of first grooves 306A and the plurality of second grooves 306B with the light absorbing material 308 are done simultaneously.

In some embodiments, the method 600 further includes placing at least a bead 708 of the light absorbing material 308 between the first microstructured layer 302A and the second microstructured layer 302B along respective leading edges 706A, 706B of the first microstructured layer 302A and the second microstructured layer 302B. The leading edges 706A, 706B are defined along the transverse direction TD.

In some embodiments, filling at least the plurality of first grooves 306A and the plurality of second grooves 306B with the light absorbing material 308 and bonding the first microstructured layer 302A to the second microstructured layer 302B with the light absorbing material 308 are done simultaneously.

In some embodiments, filling at least the plurality of the first grooves 306A and the plurality of the second grooves 306B with the light absorbing material 308 and bonding the first microstructured layer 302A to the second microstructured layer 302B further includes passing the first microstructured layer 302A and the second microstructured layer 302B through a nip roller 710 in the machine direction MD, such that the light absorbing material 308 fills at least the plurality of first grooves 306A and the plurality of second grooves 306B.

The disclosure is further described with reference to the following examples. The examples will be explained with reference to FIGS. 7A, 8A, 9A, 10A, 11A, and 12A. The following examples are offered for illustrative purposes only and is not intended to limit the scope of the disclosure in any way.

FIGS. 7A, 8A, 9A, 10A, 11A, and 12A illustrate schematic top views of exemplary articles 800, 900, 1000, 1100, 1200, 1300, respectively. The articles 800, 900, 1000, 1100, 1200, 1300 are substantially similar to the article 300, as illustrated in FIG. 2. FIGS. 7A, 8A, 9A, 10A, 11A, and 12A further illustrate different skew angles of microstructured layers of the respective articles 800, 900, 1000, 1100, 1200, 1300.

FIGS. 7B, 8B, 9B, 10B, 11B, and 12B illustrate normalized light transmittance of the articles 800, 900, 1000, 1100, 1200, 1300, respectively.

The articles 800, 900, 1000, 1100, 1200, 1300 include microstructures that were prepared in the following manner.

A plurality of microstructures was formed on a first clear channel film to form a first microstructured clear channel film (interchangeably referred to as "first film"). A plurality of microstructures was formed on a second clear channel film to form a second microstructured clear channel film (interchangeably referred to as "second film").

The plurality of microstructures formed on the first film had a height of about 148 μm, a width of about 48 μm, and a pitch between adjacent microstructures of about 64.3 μm. The plurality of microstructures formed on the second film had a height of about 66.4 μm, a width of about 49 μm and a pitch between adjacent microstructures of about 56.17 μm.

Table 1 shown below provides film description of the first film and the second film used in preparation of the articles 800, 900, 1000, 1100, 1200, 1300.

TABLE 1

| Film Description | | | |
| --- | --- | --- | --- |
| Film | Height (microns) | Width (microns) | Aspect Ratio (Height/Width) |
| First film | 148 | 48 | 3.1 |
| Second film | 66 | 49 | 1.4 |

The articles 800, 900, 1000, 1100, 1200, 1300 further include a light absorbing material. The light absorbing material included a carbon black loaded resin. A 4% carbon black solution was prepared by mixing 20 parts by weight of a carbon black pigment paste, for example, 9B1173 (commercially available from Penn Color Inc., Doylestown, Pa., USA) with 80 parts by weight of a oligoether acrylate for use in ultra violet (UV) and electron beam curing compositions, for example, SR9003 (commercially available from Sartomer Company, Exton, Pa., USA), 1 part by weight of a photoinitiator for UV curable clear coatings based on acrylates, for example, Darocur 1173 (commercially available from BASF Corporation, Wyandotte, Mich., USA) and 1 part by weight of a photoinitiator for radical polymerization of unsaturated resins upon UV light exposure, such as Irgacure 819 (commercially available from BASF Corporation, Wyandotte, Mich., USA).

The articles 800, 900, 1000, 1100, 1200, 1300 were prepared using the method 600 illustrated in FIGS. 6 and 7A-7C.

Relative Brightness Ratio Measurements

Relative Brightness Ratio (RBR) of the articles 800, 900, 1000, 1100, 1200, 1300 was measured using an Eldim 80 Conoscope (Eldim Corp., France). The articles 800, 900, 1000, 1100, 1200, 1300 were placed on top of a diffusely transmissive hollow light box. The luminance (cd/m 2) (brightness) profiles of the light box with the articles 800, 900, 1000, 1100, 1200, 1300 was measured and the ratio of this value to the value obtained without the articles 800, 900, 1000, 1100, 1200, 1300 is reported herein as the RBR. The RBR is a function of polar view angle and the geometry of the articles 800, 900, 1000, 1100, 1200, 1300.

The diffuse transmission of the light box can be described as Lambertian. The light box was a six-sided hollow cube measuring approximately 12.5 centimeter (cm)×12.5 cm×11.5 cm (L×W×H) made from diffuse polyetrafluoroethylene (PTFE) plates of approximately 6 millimeter (mm) thickness. One face of the box was chosen as the sample surface. The hollow light box had a diffuse reflectance of about 0.83 measured at the sample surface (e.g. about 83%, averaged over the 400 nm-700 nm wavelength range). During the RBR testing, the box was illuminated from within through an about 1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCR-II with a 1 cm diameter fiber bundle extension from Schott-Fostec LLC, Marlborough Mass. and Auburn N.Y.).

An Eldim 80 Conoscope (Eldim Corp, France) was used to measure the luminance (brightness) profiles of the diffuse light source both with and without the articles 800, 900, 1000, 1100, 1200, 1300. The results from these measurements are shown in Table 2. The axial brightness (AB) RBR is a special case RBR. The axial brightness RBR was the RBR based on measurements taken perpendicular to the surface of the articles 800, 900, 1000, 1100, 1200, 1300. The horizontal EPVA (Effective Polar View Angle) was determined from RBR values by adding the two polar angles along the 0 to 180 line in the conoscopic results where the RBR value is 5% or less of the AB RBR. The vertical EPVA was determined from RBR values by adding the two polar angles along the 90 to 270 line in the conoscopic results where the RBR value is 5% or less of the AB RBR. For the articles 800, 900, 1000, 1100, 1200, 1300 with significant differences in the horizontal and vertical EPVA values, the articles 800, 900, 1000, 1100, 1200, 1300 were positioned on the light box to nominally maximize the horizontal EPVA.

Table 2 represents a summary of various Example articles described in the embodiment. Microstructured layers used to construct each Example article and the skew angle between these microstructured layers are tabulated below.

TABLE 2

| Article | Microstructured Layer 1 | Microstructured Layer 2 | Skew Angle | Axial Brightness RBR | Horizontal EPVA | Vertical EPVA |
|---|---|---|---|---|---|---|
| 800 | First film | Second film | 90 | 0.40 | 88 | 64 |
| 900 | Second film | Second film | 45 | 0.51 | >160 | 111 |
| 1000 | Second film | Second film | 20 | 0.51 | >160 | 100 |
| 1100 | Second film | Second film | 90 | 0.51 | 127 | 118 |
| 1200 | First film | First film | 90 | 0.48 | 61 | 63 |
| 1300 | Second film | Second film | 0 | 0.49 | >160 | 96 |

Each of the articles 800, 900, 1000, 1100, 1200, 1300 included a Microstructured Layer 1 and a Microstructured Layer 2 having a plurality of first microstructures and a plurality of second microstructures, respectively. Each of the articles 800, 900, 1000, 1100, 1200, 1300 further included a plurality of first light absorbing regions and a plurality of second light absorbing regions. The plurality of first microstructures and the plurality of first light absorbing regions define mutually orthogonal X1, Y1 and Z1-axes. The X1 and Y1-axes are co-planer with a structured surface of the plurality of first microstructures and the plurality of first light absorbing regions while the Z1-axis is perpendicular to the plane of the structured surface. The plurality of second microstructures and the plurality of second light absorbing regions define mutually orthogonal X2, Y2 and Z2-axes. The X2 and Y2 are co-planer with a structured surface of the plurality of second microstructures and the plurality of second light absorbing regions while Z2-axis is perpendicular to the plane of the structured surface.

Figure 7B:
FIG. 7B shows a normalized light transmittance of the article of FIG. 7A.
Figure 7A:
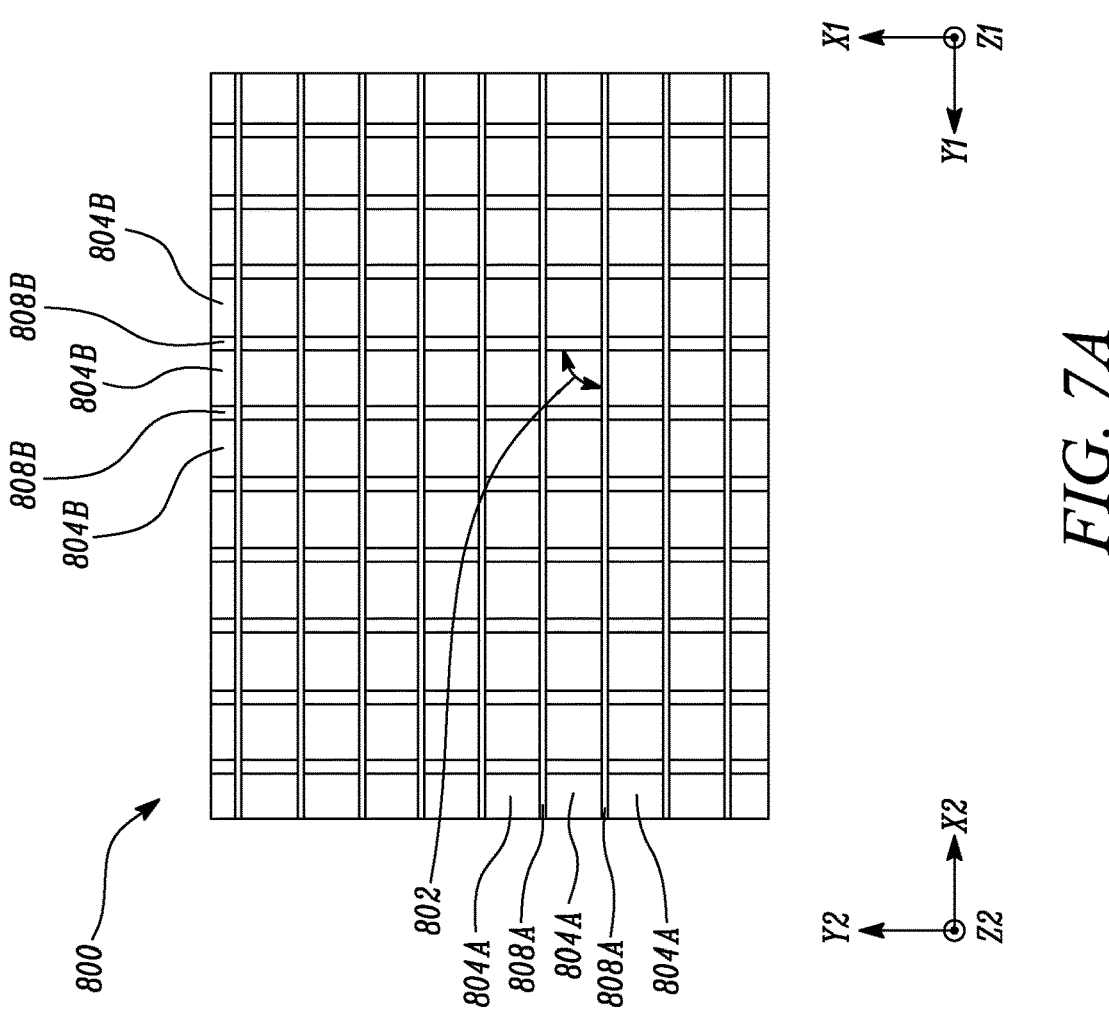
FIG. 7A shows a schematic top view of an article accord- ing to an embodiment of the present disclosure.

FIG. 7A illustrates the article 800. The article 800 was prepared using the first film as Microstructured Layer 1 and the second film as Microstructured Layer 2. In this embodiment, the plurality of microstructures of the first film corresponds to a plurality of first microstructures 804A and the plurality of microstructures of the second film corresponds to a plurality of second microstructures 804B. The article 800 further included a plurality of first light absorbing regions 808A and a plurality of second light absorbing regions 808B. Each first absorbing region 808A is disposed between corresponding two adjacent first microstructures 804A. The first absorbing regions 808A extend substantially parallel to the first microstructures 804A. Referring to FIG. 7A, both the first microstructures 804A and the first absorbing regions 808A extend along the Y1-axis. Each second absorbing region 808B is disposed between corresponding two adjacent second microstructures 804B. The second absorbing regions 808B extend substantially parallel to the second microstructures 804B. Referring to FIG. 7A, both the second microstructures 804B and the second absorbing regions 808B extend along the Y2-axis.

The article 800 included a skew angle 802 between the Y1 and Y2-axes. In other words, the article 800 included the skew angle 802 between the plurality of first light absorbing regions 808A and the plurality of second light absorbing regions 808B. A skew angle between the plurality of first microstructures 804A and the plurality of second microstructures 804B may be substantially similar to the skew angle 802. The skew angle 802 between the plurality of first light absorbing regions 808A and the plurality of second light absorbing regions 808B was about 90 degrees. Therefore, the skew angle between the plurality of first microstructures 804A and the plurality of second microstructures 804B was also about 90 degrees.

The measured optical performance data for the article 800 is shown in FIG. 7B. Specifically, FIG. 7B shows the resulting viewing angle of the article 800 of FIG. 7A. It may be apparent from the plot shown in FIG. 7B that the article 800 provided a non-symmetric performance. In other words, a non-symmetric viewing angle was observed. Specifically, the horizontal EPVA is greater than the vertical EPVA.

Figures 8A, 8B:
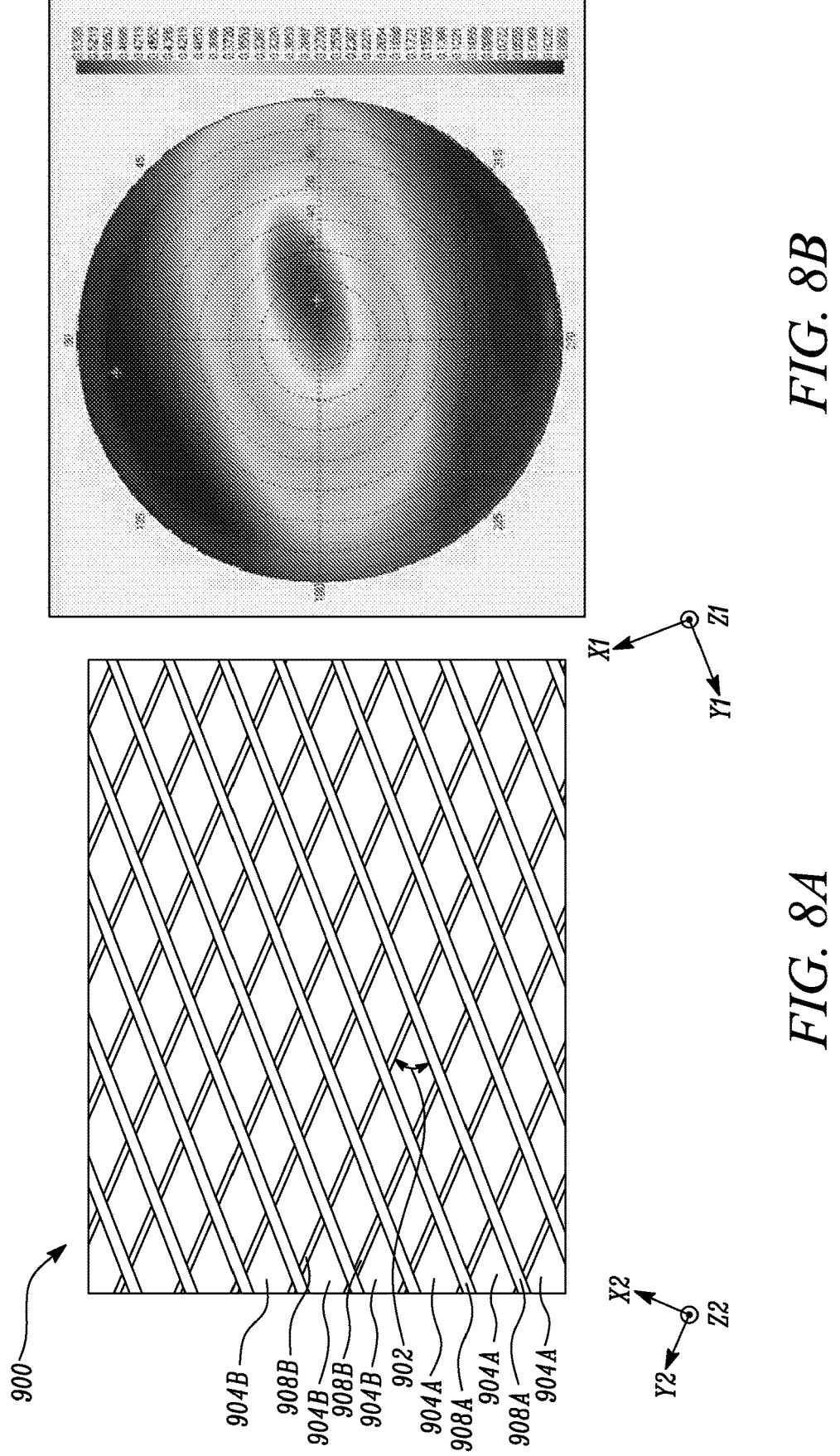
FIG. 8A shows a schematic top view of an article accord- ing to an embodiment of the present disclosure.
FIG. 8B shows a normalized light transmittance of the article of FIG. 8A.

FIG. 8A illustrates the article 900. The article 900 was prepared using two of the second films as Microstructured Layer 1 and Microstructured Layer 2. In this embodiment, the plurality of microstructures of the two second films correspond to a plurality of first microstructures 904A and a plurality of second microstructures 904B. The article 900 further included a plurality of first light absorbing regions 908A and a plurality of second light absorbing regions 908B. Each first absorbing region 908A is disposed between corresponding two adjacent first microstructures 904A. The first absorbing regions 908A extend substantially parallel to the first microstructures 904A. Referring to FIG. 8A, both the first microstructures 904A and the first absorbing regions 908A extend along the Y1-axis. Each second absorbing region 908B is disposed between corresponding two adjacent second microstructures 904B. The second absorbing regions 908B extend substantially parallel to the second microstructures 904B. Referring to FIG. 8A, both the second microstructures 904B and the second absorbing regions 908B extend along the Y2-axis.

The article 900 included a skew angle 902 between the Y1 and Y2-axes. In other words, the article 900 included the skew angle 902 between the plurality of first light absorbing regions 908A and the plurality of second light absorbing regions 908B. A skew angle between the plurality of first microstructures 904A and the plurality of second microstructures 904B may be substantially similar to the skew angle 902. The skew angle 902 between the plurality of first light absorbing regions 908A and the plurality of second light absorbing regions 908B was about 45 degrees. Therefore, the skew angle between the plurality of first microstructures 904A and the plurality of second microstructures 904B was also about 45 degrees.

The measured optical performance data for the article 900 is shown in FIG. 8B. Specifically, FIG. 8B shows the resulting viewing angle of the article 900 of FIG. 8A. It may be apparent from the plot shown in FIG. 8B that the article 900 provided a non-symmetric performance. In other words, a non-symmetric viewing angle was observed. Specifically, the horizontal EPVA is greater than the vertical EPVA.

Figure 9B:
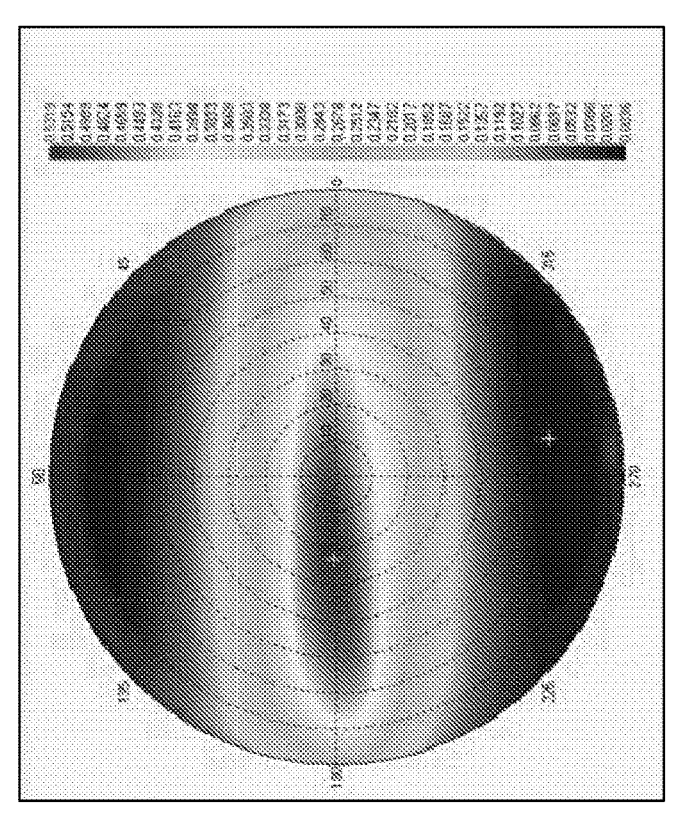
FIG. 9B shows a normalized light transmittance of the article of FIG. 9A.
Figure 9A:
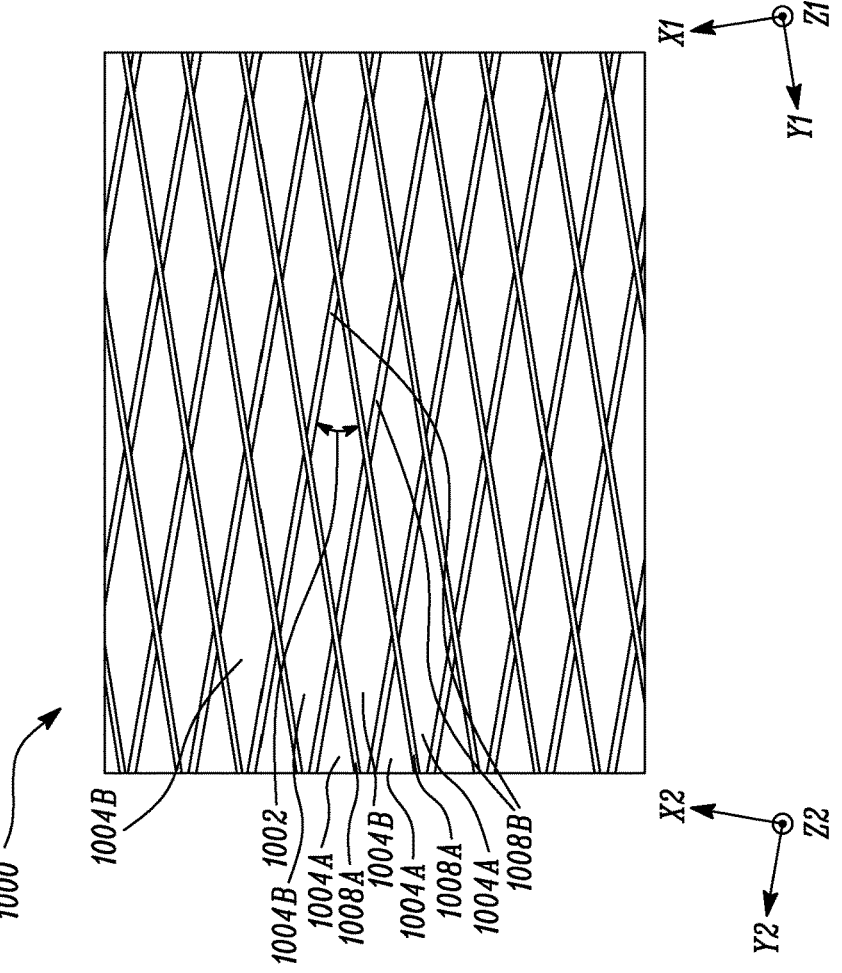
FIG. 9A shows a schematic top view of an article accord- ing to an embodiment of the present disclosure.

FIG. 9A illustrates the article 1000. The article 1000 was prepared using two of the second films as Microstructured Layer 1 and Microstructured Layer 2. In this embodiment, the plurality of microstructures of the two second films corresponds to a plurality of first microstructures 1004A and a plurality of second microstructures 1004B. The article 1000 further included a plurality of first light absorbing regions 1008A and a plurality of second light absorbing regions 1008B. Each first absorbing region 1008A is disposed between corresponding two adjacent first microstructures 1004A. The first absorbing regions 1008A extend substantially parallel to the first microstructures 1004A. Referring to FIG. 9A, both the first microstructures 1004A and the first absorbing regions 1008A extend along the Y1-axis. Each second absorbing region 1008B is disposed between corresponding two adjacent second microstructures 1004B. The second absorbing regions 1008B extend substantially parallel to the second microstructures 1004B. Referring to FIG. 9A, both the second microstructures 1004B and the second absorbing regions 1008B extend along the Y2-axis.

The article 1000 included a skew angle 1002 between the Y1 and Y2-axes. In other words, the article 1000 included the skew angle 1002 between the plurality of first light absorbing regions 1008A and the plurality of second light absorbing regions 1008B. A skew angle between the plurality of first microstructures 1004A and the plurality of second microstructures 1004B may be substantially similar to the skew angle 1002. The skew angle 1002 between the plurality of first light absorbing regions 1008A and the plurality of second light absorbing regions 1008B was about 20 degrees. Therefore, the skew angle between the plurality of first microstructures 1004A and the plurality of second microstructures 1004B was also about 20 degrees.

The measured optical performance data for the article 1000 is shown in FIG. 9B. Specifically, FIG. 9B shows the resulting viewing angle of the article 1000 of FIG. 9A. It may be apparent from the plot shown in FIG. 9B that the article 1000 also provided a non-symmetric performance. In other words, a non-symmetric viewing angle was observed. Specifically, the horizontal EPVA is greater than the vertical EPVA.

Figure 10B:
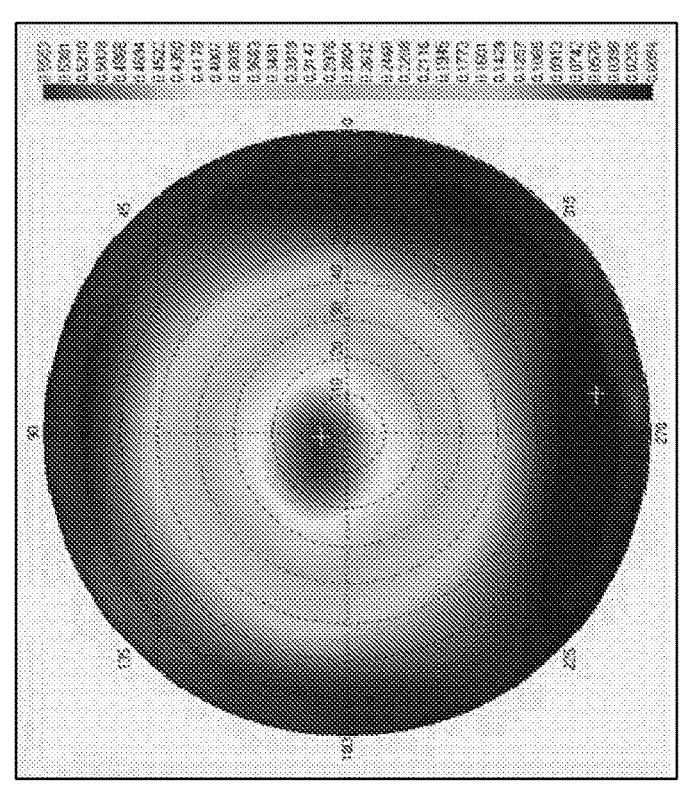
FIG. 10B shows a normalized light transmittance of the article of FIG. 10A.
Figure 10A:
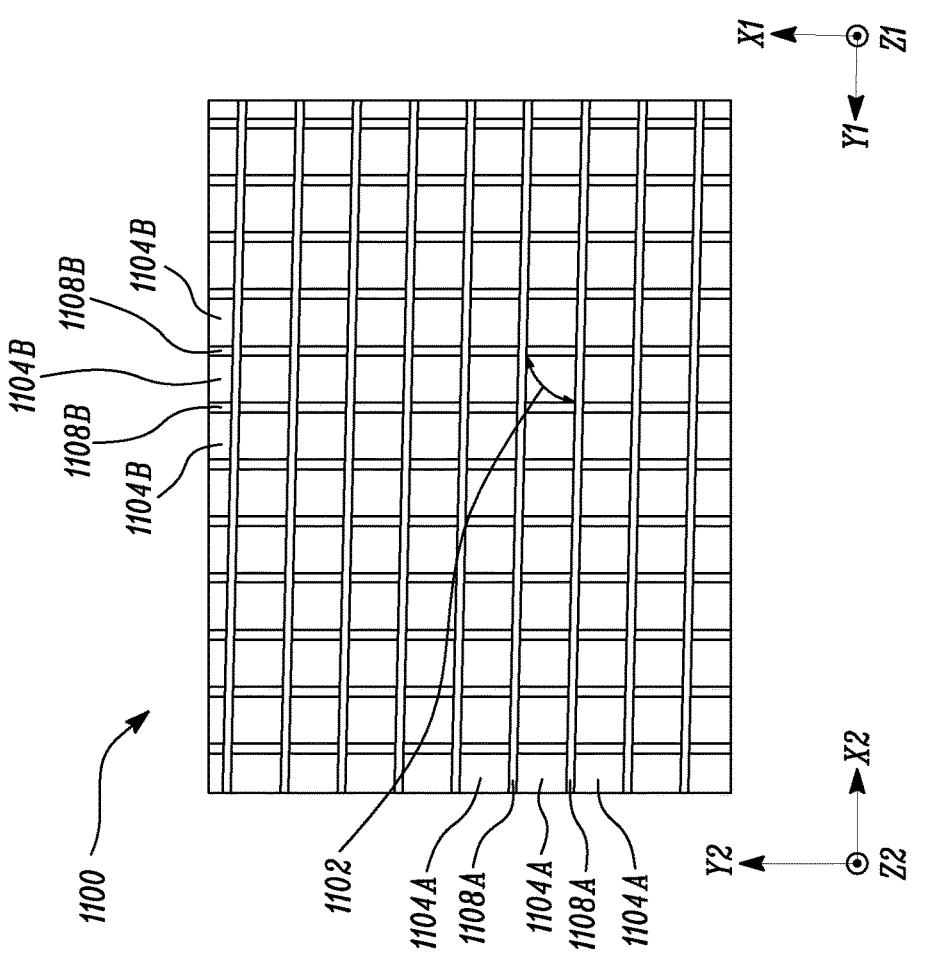
FIG. 10A shows a schematic top view of an article according to an embodiment of the present disclosure.

FIG. 10A illustrates the article 1100. The article 1100 was prepared using two of the second films as Microstructured Layer 1 and Microstructured Layer 2. In this embodiment, the plurality of microstructures of the two second films correspond to a plurality of first microstructures 1104A and a plurality of second microstructures 1104B. The article 1100 further included a plurality of first light absorbing regions 1108A and a plurality of second light absorbing regions 1108B. Each first absorbing region 1108A is disposed between corresponding two adjacent first microstructures 1104A. The first absorbing regions 1108A extend substantially parallel to the first microstructures 1104A. Referring to FIG. 10A, both the first microstructures 1104A and the first absorbing regions 1108A extend along the Y1-axis. Each second absorbing region 1108B is disposed between corresponding two adjacent second microstructures 1104B. The second absorbing regions 1108B extend substantially parallel to the second microstructures 1104B. Referring to FIG. 10A, both the second microstructures 1104B and the second absorbing regions 1108B extend along the Y2-axis.

The article 1100 included a skew angle 1102 between the Y1 and Y2-axes. In other words, the article 1100 included the skew angle 1102 between the plurality of first light absorbing regions 1108A and the plurality of second light absorbing regions 1108B. A skew angle between the plurality of first microstructures 1104A and the plurality of second microstructures 1104B may be substantially similar to the skew angle 1102. The skew angle 1102 between the plurality of first light absorbing regions 1108A and the plurality of second light absorbing regions 1108B was about 90 degrees. Therefore, the skew angle between the plurality of first microstructures 1104A and the plurality of second microstructures 1104B was also about 90 degrees.

The measured optical performance data for the article 1100 is shown in FIG. 10B. Specifically, FIG. 10B shows the resulting viewing angle of the article 1100 of FIG. 10A. It may be apparent from the plot shown in FIG. 10B that the article 1100 provided a substantially rotationally symmetric performance. In other words, a 360 degrees privacy was observed.

Figure 11B:
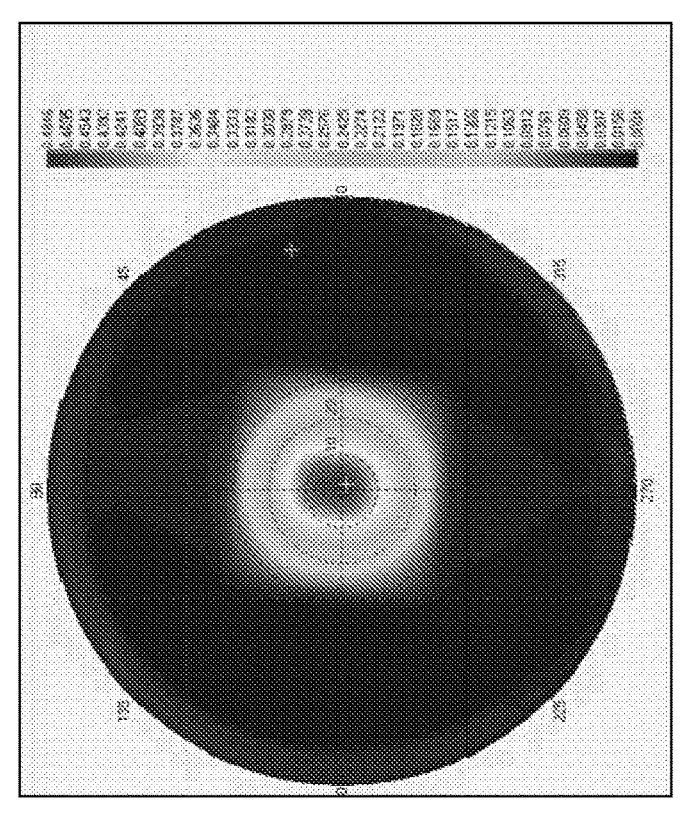
FIG. 11B shows a normalized light transmittance of the article of FIG. 11A.
Figure 11A:
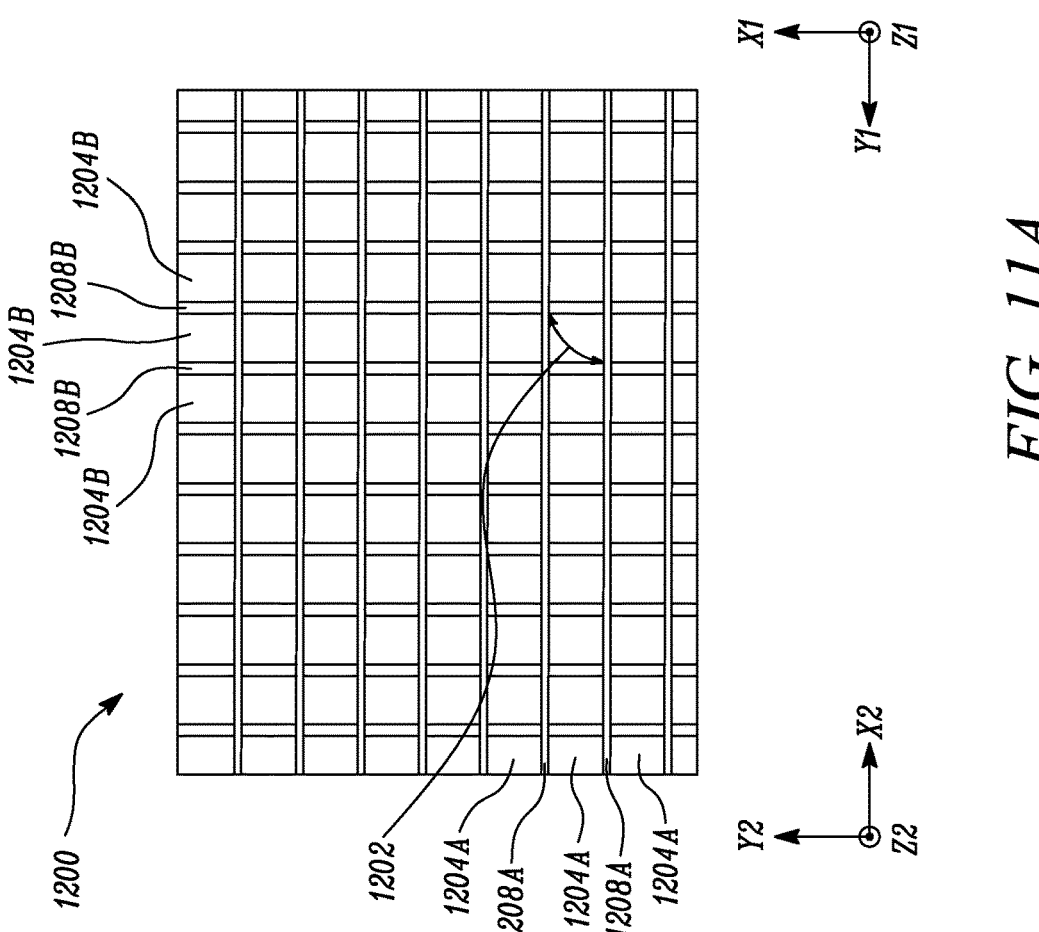
FIG. 11A shows a schematic top view of an article according to an embodiment of the present disclosure.

FIG. 11A illustrates the article 1200. The article 1200 was prepared using two of the first films as Microstructured Layer 1 and Microstructured Layer 2. In this embodiment, the plurality of microstructures of the two first films correspond to a plurality of first microstructures 1204A and a plurality of second microstructures 1204B. The article 1200 further included a plurality of first light absorbing regions 1208A and a plurality of second light absorbing regions 1208B. Each first absorbing region 1208A is disposed between corresponding two adjacent first microstructures 1204A. The first absorbing regions 1208A extend substantially parallel to the first microstructures 1204A. Referring to FIG. 11A, both the first microstructures 1204A and the first absorbing regions 1208A extend along the Y1-axis. Each second absorbing region 1208B is disposed between corresponding two adjacent second microstructures 1204B. The second absorbing regions 1208B extend substantially parallel to the second microstructures 1204B. Referring to FIG. 11A, both the second microstructures 1204B and the second absorbing regions 1208B extend along the Y2-axis.

The article 1200 included a skew angle 1202 between the Y1 and Y2-axes. In other words, the article 1200 included the skew angle 1202 between the plurality of first light absorbing regions 1208A and the plurality of second light absorbing regions 1208B. A skew angle between the plurality of first microstructures 1204A and the plurality of second microstructures 1204B may be substantially similar to the skew angle 1202. The skew angle 1202 between the plurality of first light absorbing regions 1208A and the plurality of second light absorbing regions 1208B was about 90 degrees. Therefore, the skew angle between the plurality of first microstructures 1204A and the plurality of second microstructures 1204B was also about 90 degrees.

The measured optical performance data for the article 1200 is shown in FIG. 11B. Specifically, FIG. 11B shows the resulting viewing angle of the article 1200 of FIG. 11A. It may be apparent from the plot show in FIG. 11B that the article 1200 provided a substantially rotationally symmetric performance. In other words, a 360 degrees privacy was observed. Specifically, the horizontal EPVA is substantially similar to the vertical EPVA.

Figure 12B:
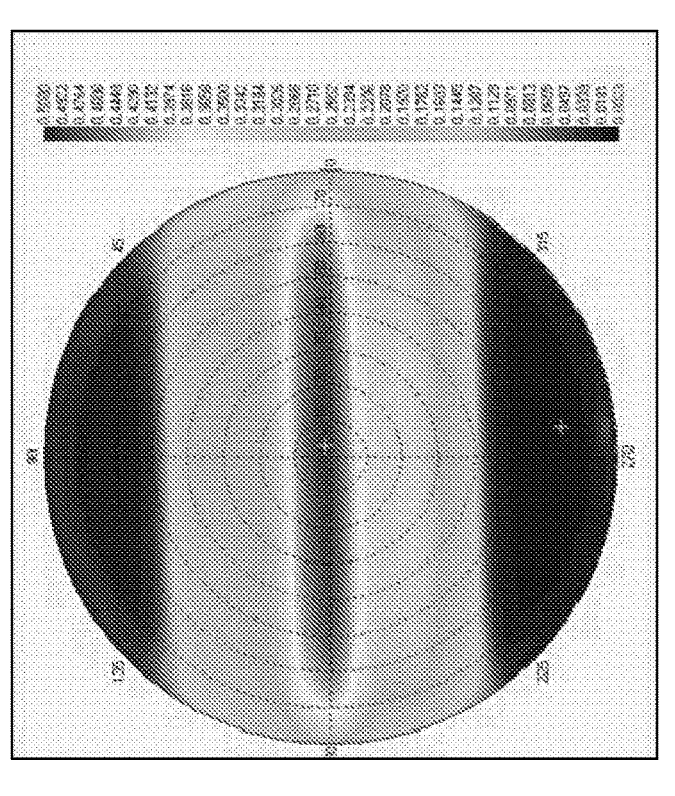
FIG. 12B shows a normalized light transmittance of the article of FIG. 12A.
Figure 12A:
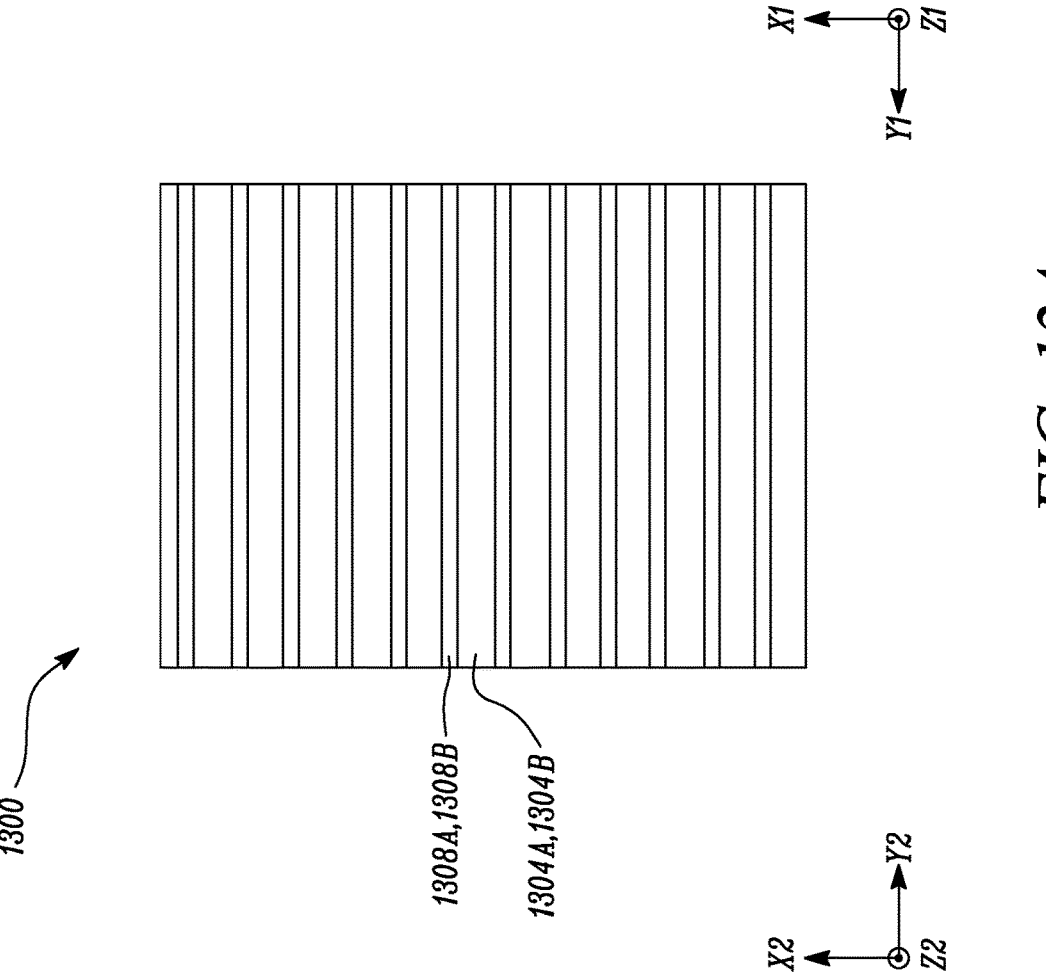
FIG. 12A shows a schematic top view of an article according to an embodiment of the present disclosure.

FIG. 12A illustrates the article 1300. The article 1300 was prepared using two of the second films as Microstructured Layer 1 and Microstructured Layer 2. In this embodiment, the plurality of microstructures of the second film corresponds to a plurality of first microstructures 1304A and the plurality of microstructures of another second film corresponds to a plurality of second microstructures 1304B. The article 1300 further included a plurality of first light absorbing regions 1308A and a plurality of second light absorbing regions 1308B. Each first absorbing region 1308A is disposed between corresponding two adjacent first microstructures 1304A. The first absorbing regions 1308A extend substantially parallel to the first microstructures 1304A. Each second absorbing region 1308B is disposed between corresponding two adjacent second microstructures 1304B. The second absorbing regions 1308B extend substantially parallel to the second microstructures 1304B. The first light absorbing regions 1308A and the second light absorbing regions 1308B of the article 1300 were substantially registered. However, in some other cases, the first light absorbing regions 1308A of the article 1300 may be offset along the Y1-axis and the second light absorbing regions 1308B of the article 1300 may be offset along the Y2-axis. Further, the plurality of first microstructures 1304A and the plurality of second microstructures 1304B of the article 1300 were also substantially registered. However, in some other cases, the first microstructures 1304A of the article 1300 may be offset along the X1-axis and the second microstructures 1304B of the article 1300 may be offset along the X2-axis.

The article 1300 included a skew angle 1302 (not shown in FIG. 12A, since the skew angle 1302 was about 0 degree) between the Y1 and Y2-axes. In other words, the article 900 included the skew angle 902 between the plurality of first light absorbing regions 1308A and the plurality of second light absorbing regions 1308B. A skew angle between the plurality of first microstructures 1304A and the plurality of second microstructures 1304B may be substantially similar to the skew angle 1302. The skew angle 1302 between the plurality of first light absorbing regions 1308A and the plurality of second light absorbing regions 1308B was about 0 degree. Therefore, the skew angle between the plurality of first microstructures 1304A and the plurality of second microstructures 1304B was also about 0 degree.

The measured optical performance data for the article 1300 is shown in FIG. 12B. Specifically, FIG. 12B shows the resulting viewing angle of the article 1300 of FIG. 12A. It may be apparent from the plot shown in FIG. 12B that the article 1300 also provided a non-symmetric performance. In other words, a non-symmetric viewing angle was observed. Specifically, the horizontal EPVA is greater than the vertical EPVA.

As is apparent from the exemplary articles 800, 900, 1000, 1100, 1200, 1300 and Table 2, the viewing angles may be controlled by changing or adjusting the skew angle 802, 902, 1002, 1102, 1202, 1302, between the pluralities of first and second microstructures 804A, 904A, 1004A, 1104A, 1204A, 1304A, 804B, 904B, 1004B, 1104B, 1204B, 1304B. Specifically, if the pluralities of first and second microstructures 804A, 904A, 1004A, 1104A, 1204A, 1304A, 804B, 904B, 1004B, 1104B, 1204B, 1304B are perpendicular and have same aspect ratios, nearly rotationally symmetric performance may be observed. For example, for the pluralities of first and second microstructures 1104A, 1204A, 1104B, 1204B, nearly rotationally symmetric performance may be observed. The pluralities of first and second microstructures 804A, 804B are perpendicular but have different aspect ratios therefore, non-symmetric viewing angles is observed. Further, if the pluralities of first and second microstructures 804A, 904A, 1004A, 1104A, 1204A, 1304A, 804B, 904B, 1004B, 1104B, 1204B, 1304B have a skew angle between 0 degree and 90 degrees, or different aspect ratios, non-symmetric viewing angles may be observed. The non-symmetric viewing angles may be desirable in some applications. Further, it may also be observed that if the skew angle of the pluralities of first and second microstructures 804A, 904A, 1004A, 1104A, 1204A, 1304A, 804B, 904B, 1004B, 1104B, 1204B, 1304B approaches 90 degrees, substantially symmetric viewing angles may be observed. For example, a difference between the horizontal EPVA and the vertical EPVA for the article 1300 having the skew angle equal to about 0 degrees is greater than a difference between the horizontal EPVA and the vertical EPVA for the article 1000 having the skew angle equal to about 20 degrees. Similarly, the difference between the horizontal EPVA and the vertical EPVA for the article 1000 having the skew angle equal to about 20 degrees is greater than a difference between the horizontal EPVA and the vertical EPVA for the article 900 having the skew angle equal to about 45 degrees. The pluralities of first and second microstructures 1304A, 1000A, 900A, 1304B, 1000A, 900A have equal aspect ratios and include the second film.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An article comprising:
   a first microstructured layer comprising a plurality of first microstructures forming a plurality of first grooves therebetween;
   a second microstructured layer comprising a plurality of second microstructures disposed adjacent to the plurality of first microstructures, the plurality of second microstructures forming a plurality of second grooves therebetween; and
   a light absorbing material disposed in at least each of the plurality of first grooves and each of the plurality of second grooves, wherein the light absorbing material bonds the first microstructured layer to the second microstructured layer;
   wherein:
   the first microstructured layer further comprises a first base layer;
   the plurality of first microstructures is joined to the first base layer; and the plurality of first microstructures further defines a first structured surface and the first base layer defines a first non-structured surface opposite to the first structured surface.

2. The article of claim 1, wherein:

the second microstructured layer further comprises a second base layer;

the plurality of second microstructures is joined to the second base layer; and the plurality of second microstructures further defines a second structured surface and the second base layer further defines a second non-structured surface opposite to the second structured surface.

3. The article of claim 2, wherein the light absorbing material further bonds the first structured surface to the second structured surface.

4. The article of claim 2, wherein each of the first non-structured surface and the second non-structured surface is substantially planar.

5. The article of claim 2, further comprising a second land disposed between the second base layer and the plurality of second microstructures.

6. The article of claim 1, further comprising a first land disposed between the first base layer and the plurality of first microstructures.

7. The article of claim 1, wherein a skew angle is defined between the plurality of first microstructures and the plurality of second microstructures, and wherein the skew angle is greater than or equal to 0 degree and less than or equal to 90 degrees.

8. The article of claim 1, wherein each of the plurality of first microstructures defines a first height, a first width, and a first aspect ratio as a ratio of the first height to the first width, and wherein the first aspect ratio is in a range from about 1.1 to about 13.5.

9. The article of claim 8, wherein the first aspect ratio is in a range from about 1.2 to about 7.9.

10. The article of claim 1, wherein each of the plurality of second microstructures defines a second height, a second width, and a second aspect ratio as a ratio of the second height to the second width, and wherein the second aspect ratio in a range from about 1.1 to about 13.5.

11. The article of claim 10, wherein the second aspect ratio is in a range from about 1.2 to about 7.9.

12. The article of claim 10, wherein the first aspect ratio of the plurality of first microstructures is substantially equal to the second aspect ratio of the plurality of second microstructures.

13. The article of claim 10, wherein the first aspect ratio of the plurality of first microstructures is different from the second aspect ratio of the plurality of second microstructures.

14. The article of claim 1, wherein each of the plurality of first microstructures has a first refractive index and each of the plurality of second microstructures has a second refractive index, and wherein each of the first refractive index and the second refractive index is in a range from about 1.44 to about 1.66.

15. The article of claim 1, wherein the light absorbing material comprises a binder and one or more of a light absorbing dye, a light absorbing pigment, a light absorbing bead, a light absorbing particle, and a carbon black dispersed in the binder.

16. The article of claim 15, wherein the binder comprises one or more of acrylate, polyethylene terephthalate (PET), polycarbonate, polymethylmethacrylate (PMMA), polyvinyl chloride (PVC), polyvinyl alcohol (PVA), polyolefin, polyethylene, polyethylene naphthalate, cellulose acetate, polystyrene, and polyimide.

17. The article of claim 15, wherein the binder comprises a radiation cured resin or a thermally cured resin.

18. The article of claim 1, further comprising a layer of the light absorbing material disposed between the plurality of first microstructures and the plurality of second microstructures.

19. A display comprising: a display panel configured to emit an image for viewing by a viewer, and an article having a first microstructured layer comprising a plurality of first microstructures forming a plurality of first grooves therebetween; a second microstructured layer comprising a plurality of second microstructures disposed adjacent to the plurality of first microstructures, the plurality of second microstructures forming a plurality of second grooves therebetween; and a light absorbing material disposed in at least each of the plurality of first grooves and each of the plurality of second grooves, wherein the light absorbing material bonds the first microstructured layer to the second microstructured layer; wherein: the first microstructured layer further comprises a first base layer; the plurality of first microstructures is joined to the first base layer; and the plurality of first microstructures further defines a first structured surface and the first base layer defines a first non-structured surface opposite to the first structured surface, disposed adjacent to the display panel.

* * * * *